(12) United States Patent
Karube et al.

(10) Patent No.: US 10,817,962 B2
(45) Date of Patent: Oct. 27, 2020

(54) FARM FIELD MANAGEMENT APPARATUS, FARM FIELD MANAGEMENT METHOD, AND STORAGE MEDIUM

(71) Applicant: Hitachi, Ltd., Chiyoda-ku, Tokyo (JP)

(72) Inventors: Isao Karube, Tokyo (JP); Naohiro Furukawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 861 days.

(21) Appl. No.: 15/510,774

(22) PCT Filed: May 1, 2015

(86) PCT No.: PCT/JP2015/063078
§ 371 (c)(1),
(2) Date: Mar. 13, 2017

(87) PCT Pub. No.: WO2016/178268
PCT Pub. Date: Nov. 10, 2016

(65) Prior Publication Data
US 2017/0287082 A1    Oct. 5, 2017

(51) Int. Cl.
| G06Q 10/00 | (2012.01) |
| G06Q 50/02 | (2012.01) |
| G06Q 10/06 | (2012.01) |
| A01B 79/00 | (2006.01) |
| A01D 45/10 | (2006.01) |

(52) U.S. Cl.
CPC ....... *G06Q 50/02* (2013.01); *G06Q 10/06311* (2013.01); *G06Q 10/06313* (2013.01); *A01B 79/005* (2013.01); *A01D 45/10* (2013.01)

(58) Field of Classification Search
CPC .............................. G06Q 50/02; A01B 79/005
See application file for complete search history.

(56) References Cited

U.S. PATENT DOCUMENTS

| 2002/0016676 A1* | 2/2002 | Sann ...................... G06Q 10/06 702/3 |
| 2006/0074560 A1* | 4/2006 | Dyer .................... A01B 79/005 702/5 |

(Continued)

FOREIGN PATENT DOCUMENTS

| JP | 2002-149744 A | 5/2002 |
| JP | 2002-305971 A | 10/2002 |
| WO | WO 2013/088538 A1 | 6/2013 |

OTHER PUBLICATIONS

Wilson, L.T. and Barnett, W.W. (1983) Degree-days An aid in crop and pest management. California Agriculture, 37, 4-7 (Year: 1983).*

(Continued)

*Primary Examiner* — Rutao Wu
*Assistant Examiner* — Scott M Ross
(74) *Attorney, Agent, or Firm* — Crowell & Moring LLP

(57) ABSTRACT

A farm field management apparatus: in generation of each task plan candidate, selects at least one task that includes harvest task, selects, a resource that is used to carry out each selected task, determines a task time within a predetermined period in which each selected task is carried out, includes the selected task, the selected resource, and the determined task time in each task plan candidate; obtains; information about a harvest impeding factor that is predicted for a harvest time of each task plan candidate; calculate an income from a harvest of each task plan candidate, based on a relevant piece of the harvest impeding factor information, and on the quantity and unit price of each crop; and calculates task cost of each task plan candidate based on a resource utilization period of the resource included in each task plan candidate, and on the utilization cost.

11 Claims, 13 Drawing Sheets

| AGRICULTURAL CHEMICAL/ FERTILIZER ID | TYPE | APPLICABLE DISEASE/ INSECT PEST NAME | PRICE | EFFECT-ON-SCALE DEGREE | EFFECT-ON-DISTRIBUTION-MODEL DEGREE |
|---|---|---|---|---|---|
| 0001 | ATTRACTANT | CLICK BEETLE | 2000 | -2t | -t |
| 0002 | FUNGICIDE | SMUT | 500 | -t | 0 |
| 0003 | INSECTICIDE | PYRALID | 1000 | -3t | -t |
| ... | ... | ... | ... | ... | ... |

320 / 321 / 322 / 323 / 324 / 325 / 32

(56) References Cited

U.S. PATENT DOCUMENTS

| | | |
|---|---|---|
| 2011/0035246 A1 | 2/2011 | Fithian et al. |
| 2012/0101861 A1* | 4/2012 | Lindores .............. G06Q 10/063 705/7.11 |
| 2013/0174040 A1* | 7/2013 | Johnson ................ G06Q 10/06 715/733 |
| 2016/0202227 A1* | 7/2016 | Mathur ................. G06Q 50/02 702/2 |
| 2019/0220964 A1* | 7/2019 | Mello .................... B64D 47/00 |

OTHER PUBLICATIONS

Food Security, Vulnerability and Environmental Risk Assessment, David A. Andow, 2011, 192-195 (Year: 2011).*

Tang, S., G. Tang, and R. Cheke. "Optimum Timing for Integrated Pest Management of Modeling Rates of Pesticide Application and Natural Enemy Releases." Journal of Theoretical Biology, 264:2, pp. 623-638, (2010), (Year: 2010).*

Prasad Y, Prabhakar M (2012), Pest Monitoring and Forecasting. In: Shankar U, Abrol DP (eds) Integrated Pest Management: Principles and Practice. CABI, Oxfordshire, pp. 41-57: (Year: 2012).*

International Search Report (PCT/ISA/210) issued in PCT Application No. PCT/JP2015/063078 dated Jul. 28, 2015 with English translation (three pages).

Japanese-language Written Opinion (PCT/ISA/237) issued in PCT Application No. PCT/JP2015/063078 dated Jul. 28, 2015 (three pages).

\* cited by examiner

| 310 | 311 | 312 | 313 | 314 | 315 | 316 | 317 | 318 |
|---|---|---|---|---|---|---|---|---|
| DISEASE/ INSECT PEST ID | NAME | IMAGE DATA | OCCUR-RENCE TIME | BODY LENGTH | INCREASE DISTRIBU-TION MODEL | INITIAL PARAM-ETER | PARAM-ETER | PER-INSECT DAMAGED CANE COUNT |
| 0001 | PYRALID | 1001.jpg, 1002.jpg, 1003.jpg | JULY TO SEP-TEMBER | 5cm | NORMAL DISTRIBU-TION | $\mu_0, \sigma_0$ | $\mu=\mu_0+10t, \sigma=\sigma_0+5t$ | 1 |
| 0002 | CLICK BEETLE | 2001.jpg, 2002.jpg, 2003.jpg | MAY TO AUGUST | 5cm | NORMAL DISTRIBU-TION | $\mu_0, \sigma_0$ | $\mu=\mu_0+6t, \sigma=\sigma_0+5t$ | 0.5 |
| 0003 | SCARAB BEETLE | 3001.jpg, 3002.jpg, 3003.jpg | MAY TO NOVEM-BER | 5cm | GAMMA DISTRIBU-TION | $\kappa, \theta$ | $\kappa=10t, \theta=5t$ | 0.5 |
| 0004 | WEEVIL | 4001.jpg, 4002.jpg, 4003.jpg | APRIL TO MAY | 5cm | NORMAL DISTRIBU-TION | $\mu_0, \sigma_0$ | $\mu=\mu_0+10t, \sigma=\sigma_0+5t$ | 0.2 |
| 0005 | SMUT | 5001.jpg, 5002.jpg | SEPTEM-BER TO OCTO-BER | — | NORMAL DISTRIBU-TION | $\mu_0, \sigma_0$ | $\mu=\mu_0+10t, \sigma=\sigma_0+5t$ | 1 |
| ... | ... | ... | ... | ... | ... | ... | ... | ... |

FIG. 2

| 320 | 321 | 322 | 323 | 324 | 325 |
|---|---|---|---|---|---|
| AGRICULTURAL CHEMICAL/ FERTILIZER ID | TYPE | APPLICABLE DISEASE/ INSECT PEST NAME | PRICE | EFFECT-ON-SCALE DEGREE | EFFECT-ON-DISTRIBUTION-MODEL DEGREE |
| 0001 | ATTRACTANT | CLICK BEETLE | 2000 | $-2t$ | $-t$ |
| 0002 | FUNGICIDE | SMUT | 500 | $-t$ | 0 |
| 0003 | INSECTICIDE | PYRALID | 1000 | $-3t$ | $-t$ |
| ... | ... | ... | ... | ... | ... |

FIG. 3

| VARIETY ID | SUGAR CONTENT CHANGE (MONTHS SINCE PLANTING) | | | | | | | | | | | | UNIT SALES PRICE (x = SUGAR CONTENT) |
|---|---|---|---|---|---|---|---|---|---|---|---|---|---|
| | 1 | 2 | 3 | 4 | 5 | 6 | 7 | 8 | 9 | 10 | 11 | 12 | |
| 0001 | 5 | 6 | 7 | 8 | 10 | 15 | 18 | 20 | 16 | 10 | 6 | 5 | 5.2+0.3x |
| 0002 | 4 | 4 | 5 | 8 | 10 | 12 | 15 | 13 | 10 | 7 | 5 | 4 | 4.5+0.2x |
| 0003 | 3 | 3 | 4 | 7 | 9 | 11 | 13 | 10 | 8 | 7 | 4 | 3 | 6.1+0.4x |
| 0004 | 5 | 6 | 7 | 8 | 10 | 15 | 18 | 19 | 16 | 10 | 6 | 5 | 5.5 |
| ... | ... | ... | ... | ... | ... | ... | ... | ... | ... | ... | ... | ... | ... |

*FIG. 4*

| MEASUREMENT POINT (LATITUDE XXX.XX, LONGITUDE XXX.XX) | TIME | WEATHER | TEMPERATURE | HUMIDITY | PRECIPITATION (mm) | SOLAR INSOLATION W/m² |
|---|---|---|---|---|---|---|
| (XXX.XX, XX.XX) | XX MONTH XX DAY XX HOUR XX MINUTE XX SECOND | CLEAR | XX DEGREES | XX % | 0 | 100 |
| (XXX.XX, XX.XX) | XX MONTH XX DAY XX HOUR XX MINUTE XX SECOND | CLEAR | XX DEGREES | XX % | 0 | 100 |
| (XXX.XX, XX.XX) | XX MONTH XX DAY XX HOUR XX MINUTE XX SECOND | CLEAR | XX DEGREES | XX % | 0 | 100 |
| (XXX.XX, XX.XX) | XX MONTH XX DAY XX HOUR XX MINUTE XX SECOND | CLOUDY | XX DEGREES | XX % | 0 | 40 |
| ... | ... | ... | ... | ... | ... | ... |

*FIG. 5*

| MACHINE ID | MACHINE UTILIZATION RATE (MONTHLY, IN PERCENTAGE) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0001 | 0 | 0 | 50 | 85 | 89 | 92 | 94 | 93 | 90 | 91 | 89 | 70 |
| 0002 | 0 | 20 | 70 | 85 | 84 | 95 | 92 | 92 | 95 | 90 | 88 | 70 |
| 0003 | 0 | 10 | 50 | 70 | 80 | 85 | 50 | 78 | 85 | 85 | 84 | 60 |
| 0004 | 0 | 5 | 50 | 85 | 89 | 92 | 94 | 93 | 90 | 91 | 89 | 70 |
| ... | ... | ... | ... | ... | ... | ... | ... | ... | ... | ... | ... | ... |

*FIG. 6*

| RESOURCE | TASK SPECIFICS | | | | |
|---|---|---|---|---|---|
| | 1ST WEEK | 2ND WEEK | 3RD WEEK | 4TH WEEK | 5TH WEEK |
| PERSON 1 | HARVESTING FIELD A | HARVESTING FIELD B | HARVESTING FIELD C | HARVESTING FIELD D | HARVESTING FIELD E |
| PERSON 2 | HARVESTING FIELD A | HARVESTING FIELD B | HARVESTING FIELD C | HARVESTING FIELD D | HARVESTING FIELD E |
| PERSON 3 | HARVESTING FIELD A | HARVESTING FIELD B | HARVESTING FIELD C | HARVESTING FIELD D | HARVESTING FIELD E |
| PERSON 4 | HARVESTING FIELD A | HARVESTING FIELD B | HARVESTING FIELD C | HARVESTING FIELD D | HARVESTING FIELD E |

*FIG. 7*

| DISEASE/ INSECT PEST ID | NAME | PAST OCCURRENCE TIME | MEASUREMENT POINT (LATITUDE XX.XX, LONGITUDE XXX.XX) | MEASUREMENT POINT-BASED INSECT COUNT |
|---|---|---|---|---|
| 0001 | PYRALID | 2006/07/02 | (XXX.XX, XX.XX), (XXX.XX, XX.XX), (XXX.XX, XX.XX), (XXX.XX, XX.XX), (XXX.XX, XX.XX) | 2, 4, 5, 10, 7 |
| 0001 | PYRALID | 2006/07/15 | (XXX.XX, XX.XX), (XXX.XX, XX.XX), (XXX.XX, XX.XX), (XXX.XX, XX.XX), (XXX.XX, XX.XX) | 4, 8, 10, 20, 14 |
| 0002 | CLICK BEETLE | 2005/05/08 | (XXX.XX, XX.XX), (XXX.XX, XX.XX), (XXX.XX, XX.XX), (XXX.XX, XX.XX) | 3, 6, 10, 7 |
| ... | ... | ... | ... | ... |

| PATTERN ID 400 | NAME 401 | DISEASE /INSECT PEST ID 402 | PAST OCCURRENCE TIME 403 | DISTRIBUTION CENTER POINT (LATITUDE XXX.XX, LONGITUDE XXX.XX) 404 | INITIAL SCALE 405 | DISTRIBUTION PATTERN 406 | INITIAL PARAMETER 407 | POST-CHANGE SCALE 408 | POST-CHANGE PARAMETER 409 |
|---|---|---|---|---|---|---|---|---|---|
| 0001 | PYRALID 1 | 0001 | 2006/07, 2008/08, 2009/07, 2011/07, 2012/08 | (XXX.XX, XX.XX), (XXX.XX, XX.XX), (XXX.XX, XX.XX), (XXX.XX, XX.XX), (XXX.XX, XX.XX) | $a_1$ | 2D NORMAL DISTRIBUTION | $\mu_0, \mu_1,$ $\sigma_0, \sigma_1$ | $a_{1t}=a_1+0.2t$ | $\sigma_{0t}=5t,$ $\sigma_{1t}=2t$ |
| 0002 | PYRALID 2 | 0001 | 2007/07, 2008/07, 2009/06, 2013/07 | (XXX.XX, XX.XX), (XXX.XX, XX.XX), (XXX.XX, XX.XX), (XXX.XX, XX.XX) | $a_2$ | 2D GAMMA DISTRIBUTION | $k_0, k_1,$ $\theta_0, \theta_1$ | $a_{2t}=a_2+0.1t$ | $k_{0t}=10t,$ $k_{1t}=7t,$ $\theta_{0t}=5t,$ $\theta_{1t}=2t$ |
| 0003 | CLICK BEETLE | 0002 | 2005/05, 2006.05, 2006/07, 2008/05 | (XXX.XX, XX.XX), (XXX.XX, XX.XX), (XXX.XX, XX.XX), (XXX.XX, XX.XX) | $a_3$ | 2D NORMAL DISTRIBUTION | $\mu_0, \mu_1,$ $\sigma_0, \sigma_1$ | $a_{3t}=a_3+0.4t$ | $\sigma_{0t}=6t,$ $\sigma_{1t}=5t$ |
| 0004 | WEEVIL | 0004 | 2006/07 | (XXX.XX, XX.XX) | $a_4$ | $f(x_1,x_2)=ax_1+bx_2$ $+\cdots$ | — | $a_{4t}=a_4+0.3t$ | $f_t(x_1,x_2)=ax_1+b$ $x_2+\cdots-ct$ |
| ... | ... | ... | ... | ... | ... | ... | ... | ... | ... |

| RESOURCE ID | NAME | COUNT | UNIT COST |
|---|---|---|---|
| 0001 | PERSON | 100 | 100000 |
| 0002 | MACHINE A | 20 | 20000 |
| 0003 | MACHINE B | 50 | 30000 |
| ... | ... | ... | ... |

*FIG. 10*

| TASK ID | TASK SPECIFICS | RESOURCE ID | TASK EFFICIENCY |
|---|---|---|---|
| 0001 | VARIETY ID: HARVESTING 0001 | 0001 | a CANES/ WEEK |
| | | 0002 | b CANES/ WEEK |
| | | 0001 AND 0005 | c CANES/ WEEK |
| | | ... | ... |
| 0002 | AGRICULTURAL CHEMICAL/FERTILIZER ID: SPRAYING 0001 | 0010 | d ha/ WEEK |
| | | ... | ... |
| ... | ... | ... | ... |

*FIG. 11*

| FARM FIELD ID | NAME | VARIETY ID | PER-UNIT AREA CANE COUNT | PLANTED TIME |
|---|---|---|---|---|
| 0001 | FIELD A | 0001 | 1000 | 2014/ 07 |
| 0002 | FIELD B | 0003 | 2000 | 2014/ 08 |
| 0003 | FIELD C | 0010 | 3000 | 2014/ 07 |
| ... | ... | ... | ... | |

*FIG. 12*

| RESOURCE | TASK SPECIFICS | | | | |
|---|---|---|---|---|---|
| | 1ST WEEK | 2ND WEEK | 3RD WEEK | 4TH WEEK | 5TH WEEK |
| PERSON 1 | SPRAYING CHEMICAL A | SPRAYING CHEMICAL A | HARVESTING FIELD C | HARVESTING FIELD C | HARVESTING FIELD E |
| PERSON 2 | HARVESTING FIELD A | HARVESTING FIELD A | HARVESTING FIELD C | HARVESTING FIELD C | HARVESTING FIELD E |
| PERSON 3 | HARVESTING FIELD A | HARVESTING FIELD B | HARVESTING FIELD B | HARVESTING FIELD D | HARVESTING FIELD E |
| PERSON 4 | HARVESTING FIELD A | HARVESTING FIELD B | HARVESTING FIELD B | HARVESTING FIELD D | HARVESTING FIELD D |

FIG. 21

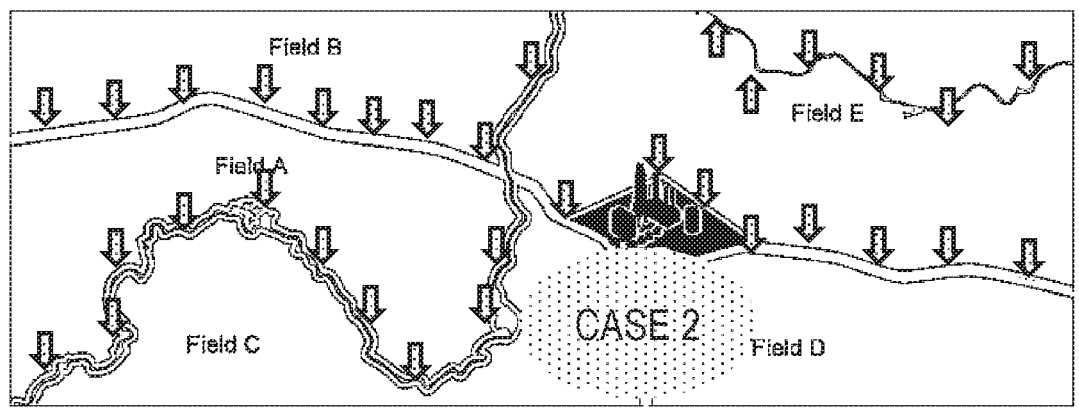

FIG. 22

| RESOURCE | TASK SPECIFICS | | | | |
|---|---|---|---|---|---|
| | 1ST WEEK | 2ND WEEK | 3RD WEEK | 4TH WEEK | 5TH WEEK |
| PERSON 1 | SPRAYING CHEMICAL A | HARVESTING FIELD A | HARVESTING FIELD B | HARVESTING FIELD C | HARVESTING FIELD D |
| PERSON 2 | SPRAYING CHEMICAL A | HARVESTING FIELD A | HARVESTING FIELD B | HARVESTING FIELD C | HARVESTING FIELD D |
| PERSON 3 | SPRAYING CHEMICAL A | HARVESTING FIELD A | HARVESTING FIELD B | HARVESTING FIELD C | HARVESTING FIELD D |
| PERSON 4 | SPRAYING CHEMICAL A | HARVESTING FIELD A | HARVESTING FIELD B | HARVESTING FIELD C | HARVESTING FIELD D |

*FIG. 23*

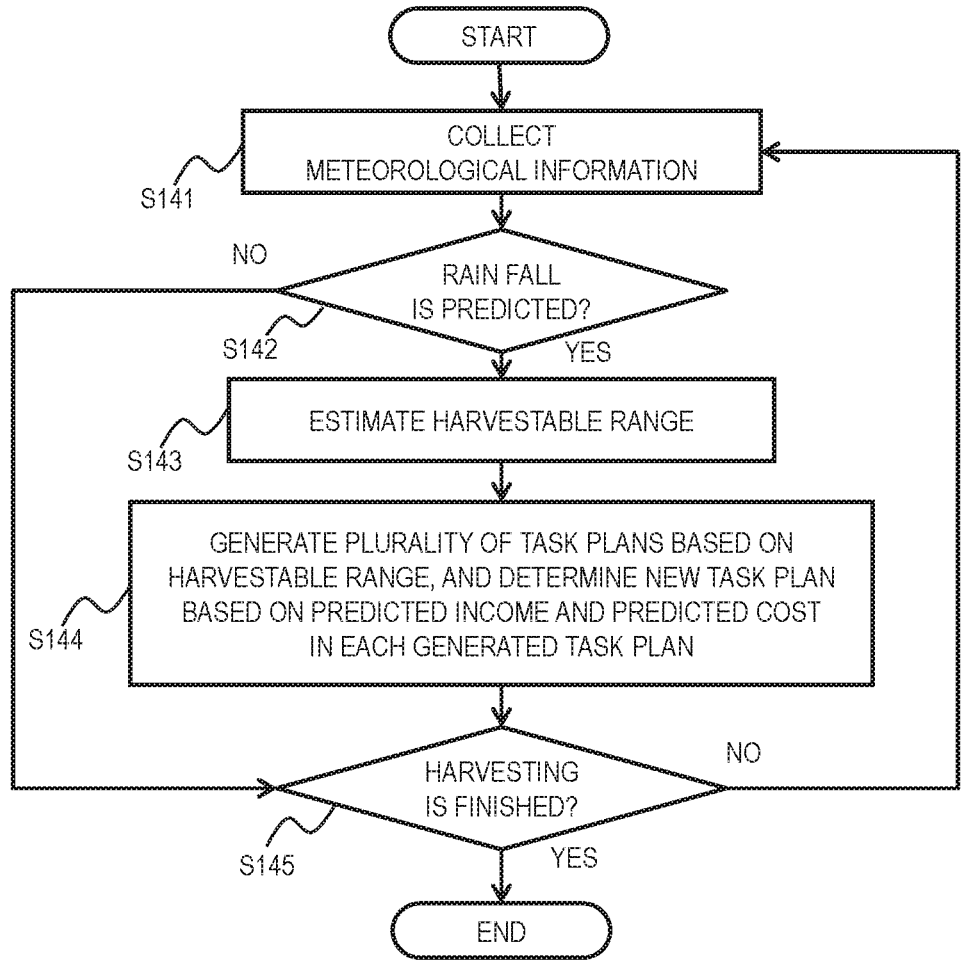

*FIG. 24*

FARM FIELD MANAGEMENT APPARATUS, FARM FIELD MANAGEMENT METHOD, AND STORAGE MEDIUM

BACKGROUND OF THE INVENTION

The present invention relates to a farm field management apparatus, a farm field management method, and a storage medium.

Planning of the distribution of resources with regards to the planting, nurturing, harvesting, and the like of agricultural products (scheduling) is a common practice in agricultural production. To accomplish proper scheduling, a diversity of information about the seeding, planting, nurturing, and harvesting of a crop needs to be accumulated and utilized in the growing of the crop. The background art in the technical field of this invention includes JP 2002-149744 A. In Abstract of this publication, there is disclosed a farm task management apparatus (method) "including means for storing location information about the location of a production unit plot of a crop, the type of the crop to be raised, and information about the grower of the crop (Step 1), means for inputting, from the grower side, a soil state and a growth state that are measured for each of a plurality of task unit plots set in each production unit plot, and storing the input information (Steps 2 to 5), means for making a fertilizing assist plan and an inspect pest control assist plan that cover a time frame till harvest and a harvest time prediction based on the soil state and/or the growth state, and presenting the plans to the grower side (Step 7), means for inputting, from the grower side, the specifics of an actual farm task performed based on the fertilizing assist plan and the inspect pest control assist plan, and storing the input information (Step 8), means for inputting, from the grower side, the actual time of harvest and crop yields and storing the input information (Step 11), and means for outputting shipment information that is to be stored on a recording medium attached to the shipped crop (Step 12)."

It is very important in a farm task to keep track of the ever-changing situation of a farm field in terms of the occurrence of diseases and insect pests and weather. The technology disclosed in JP 2002-149744 A allows for rescheduling by, for example, incorporating an insect pest control task in a farm task plan that is input by the grower in advance, but the rescheduling is set in advance and is not always optimum for the current situation.

SUMMARY OF THE INVENTION

It is therefore an object of one embodiment of this invention to dynamically generate candidates for a task plan that optimizes an income from a harvest and task cost based on predicted harvest impeding factors.

One mode of the present invention has, for example, the following configuration to solve above-mentioned problem. A farm field management apparatus, which is configured to manage a managed area including at least one farm field, the farm field management apparatus comprising: a processor; and a storage apparatus, wherein the storage apparatus is configured to hold: resource information, which indicates resources, and which indicates, for each of the resources, a task carried out by the resource and per-unit time utilization cost of the resource; and farm field information, which indicates a quantity of a crop grown in each of the at least one farm field and a unit price of the crop, wherein the resources includes a resource that is used to carry out a harvest task in the at least one farm field, and wherein the processor is configured to: generate a plurality of task plan candidates; in the generation of each of the plurality of task plan candidates, select at least one task that includes harvest task in the at least one farm field from the resource information, select, for each selected task, a resource that is used to carry out the selected task from the resource information, determine, for each selected task, a task time within a predetermined period in which the selected task is carried out, include the selected task, the selected resource, and the determined task time in each of the plurality of task plan candidates; obtain information about a harvest impeding factor that is predicted for a harvest time of each of the plurality of task plan candidates; calculate an income from a harvest of each of the plurality of task plan candidates, based on a relevant piece of the harvest impeding factor information, and on the quantity and unit price of each crop indicated by the farm field information; and calculate task cost of each of the plurality of task plan candidates based on a resource utilization period of the resource included in each of the plurality of task plan candidates, and on the utilization cost indicated by the resource information.

According to the one embodiment of this invention, candidates for a task plan that optimizes an income from a harvest and task cost can be generated dynamically to suit the situation of a farm field.

BRIEF DESCRIPTIONS OF DRAWINGS

The present invention can be appreciated by the description which follows in conjunction with the following figures, wherein:

FIG. 2 depicts an example of disease and insect pest characteristics data according to the first embodiment;

FIG. 3 depicts an example of agricultural chemical/fertilizer data according to the first embodiment;

FIG. 4 depicts an example of variety data according to the first embodiment;

FIG. 5 depicts an example of meteorological data according to the first embodiment;

FIG. 6 depicts an example of factory utilization data according to the first embodiment;

FIG. 7 depicts an example of task plan data according to the first embodiment;

FIG. 8 depicts an example of past occurrence distribution data according to the first embodiment;

FIG. 9 depicts an example of occurrence distribution pattern data according to the first embodiment;

FIG. 10 depicts an example of resource data according to the first embodiment;

FIG. 11 depicts an example of task data according to the first embodiment;

FIG. 12 depicts an example of farm field data according to the first embodiment;

FIG. 21 depicts an example of a task plan after reschedule processing according to the first embodiment;

FIG. 22 depicts an example of a result of predicting a disease/insect pest expansion distribution according to the first embodiment;

FIG. 23 depicts an example of a task plan after reschedule processing according to the first embodiment; and FIG. 24 is a flowchart depicting an example of management processing according to the second embodiment.

DETAILED DESCRIPTION OF THE PREFERRED EMBODIMENTS

A mode for carrying out this invention is described below with reference to the accompanying drawings. This embodiment mode deals with an example in which a farm field management apparatus manages at least one sugar cane farm field included in a managed area. In this embodiment, a sugar cane farm field is referred to simply as "farm field". The term "farm field" means adjoined patches in which sugar canes of the same variety are planted. A managed area includes, aside from a farm field (farm fields), a road and a factory for processing harvested sugar canes, for example. The farm field management apparatus of this embodiment may manage, in addition to sugar cane farm fields, any area that requires growth management or other similar types of management, for example, a large-scale farm where keeping track of the situations is difficult and a forest.

First Embodiment

Figure 1:
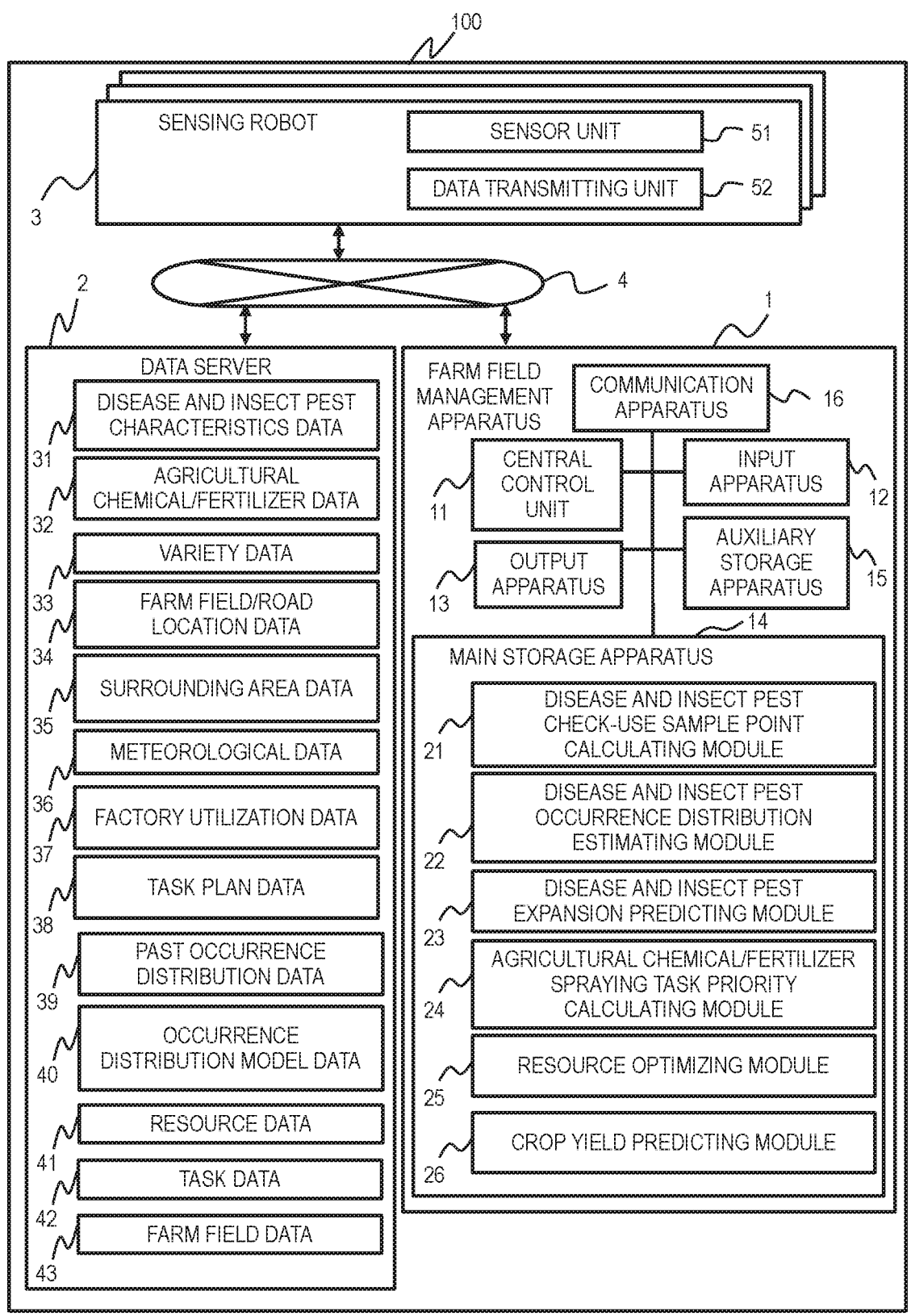
FIG. 1 is a block diagram for depicting an example of a configuration of a farm field management system according to the first embodiment.

FIG. 1 depicts an example of the configuration of a farm field management system. A farm field management system 100 includes, for example, a farm field management apparatus 1, a data server 2, and at least one sensing robot 3. The farm field management apparatus 1, the data server 2, and the sensing robot 3 can hold communication to and from one another through a network 4. The farm field management apparatus 1 is configured on a computer that includes, for example, a central control unit 11, an input apparatus 12, an output apparatus 13, a main storage apparatus 14, an auxiliary storage apparatus 15, and a communication apparatus 16, which are coupled to one another by a bus.

The central control unit 11 includes a processor and/or a logical circuit that operates as programmed by a program. The central control unit 11 inputs/outputs and reads/writes data, and executes programs described later. The main storage apparatus 14 includes a ROM, which is a non-volatile storage element, and a RAM, which is a volatile storage element. The ROM stores a program that is not changed (e.g., a BIOS) and the like. The RAM is a dynamic random access memory (DRAM) or other high-speed, volatile storage elements, and temporarily stores a program executed by the central control unit 11 and data that is used in the execution of the program.

The auxiliary storage apparatus 15 is a large-capacity, non-volatile storage apparatus, for example, a magnetic storage apparatus (an HDD) or a flash memory (an SSD), and stores a program executed by the central control unit 11 and data that is used in the execution of the program. Specifically, a program is read out of the main storage apparatus 14, or read out of the auxiliary storage apparatus 15 and loaded onto the main storage apparatus 14, to be executed by the central control unit 11.

The input apparatus 12 includes a keyboard 106, a mouse 107, and the like, and receives an input from an operator. The output apparatus 13 includes a display apparatus 109, a printer, and the like, and outputs the result of executing a program in a format that is visually recognizable to the operator.

The communication apparatus 16 is a network interface apparatus configured to control communication between the farm field management apparatus 1 and other apparatus in accordance with a predetermined protocol. The communication apparatus 16 includes a serial interface, such as a USB.

A program executed by the central control unit 11 may be provided to the farm field management apparatus 1 via a removable medium (a CD-ROM, a flash memory, or other computer-readable, non-transitory storage media) or the network 4 to be stored in the auxiliary storage apparatus 15, which is a non-transitory storage medium. The farm field management apparatus 1 is therefore recommended to include an interface configured to read data out of a removable medium.

The farm field management apparatus 1 is a computer system configured physically on a single computer, or configured on a plurality of logically or physically configured computers. The farm field management apparatus 1 may operate in separate threads on the same computer, and may operate on a virtual computer built from a plurality of physical computer resources.

The main storage apparatus 14 stores a disease and insect pest check-use sample point calculating module 21, a disease and insect pest occurrence distribution estimating module 22, a disease and insect pest expansion predicting module 23, an agricultural chemical/fertilizer spraying task priority calculating module 24, a resource optimizing module 25, and a crop yield predicting module 26, which are each a program. Some or all of the programs stored in the main storage apparatus 14 may be stored in, for example, the auxiliary storage apparatus 15.

The central control unit 11 operates as function modules that implement predetermined functions, by operating as programmed by programs. For instance, the central control unit 11 functions as a disease and insect pest check-use sample point calculating module by operating as programmed by the disease and insect pest check-use sample point calculating module 21, and functions as a disease and insect pest occurrence distribution estimating module by operating as programmed by the disease and insect pest occurrence distribution estimating module 22. The central control unit 11 further operates as function modules that respectively implement a plurality of processing procedures executed by each program. A computer and a computer system are an apparatus and a system that include such function modules.

The disease and insect pest check-use sample point calculating module 21 is configured to calculate a sample point, which is a spot where the sensing robot 3 checks for the presence or absence of diseases and insect pests, based on the location of a road or the like in a managed area. The occurrence of a disease or an insect pest is an example of harvest impeding factors. A disease or an insect pest in a farm field causes, for example, reduced crop yields in the farm field.

The disease and insect pest occurrence distribution estimating module 22 is configured to estimate the distribution of a disease or an inspect pest that has occurred at a sample point. The disease and insect pest expansion predicting module 23 is configured to predict the future expansion of the disease or the insect pest from the estimated distribution of the disease or the insect pest. The agricultural chemical/fertilizer spraying task priority calculating module 24 is configured to calculate the priority of agricultural chemical/fertilizer spraying task from the result of the disease and insect pest expansion prediction. The resource optimizing module 25 is configured to optimize resources and generate a new task plan. The crop yield predicting module 26 is configured to predict crop yields in accordance with the generated task plan, an income at the crop yields, and costs for resources, agricultural chemicals, and fertilizers.

The data server 2 stores data to be provided to the farm field management apparatus 1. Examples of the data stored on the data server 2 include disease and insect pest characteristics data 31, agricultural chemical/fertilizer data 32, variety data 33, farm field/road location data 34, surrounding area data 35, meteorological data 36, factory utilization data 37, task plan data 38, past occurrence distribution data 39, occurrence distribution pattern data 40, and resource data 41. Some or all of the pieces of data stored on the data server 2 may be stored in, for example, the auxiliary storage apparatus 15.

The disease and insect pest characteristics data 31 is data about diseases that affect sugar canes and data about insect pests that feed on sugar canes. The agricultural chemical/fertilizer data 32 is data about agricultural chemicals used in the growing of sugar canes and data about fertilizer used in the growing of sugar canes. The variety data 33 is data about each sugar cane variety produced in a farm field.

The farm field/road location data 34 is map data of a managed area, and is in a GML format, a uniquely organized vector format, or the like. The farm field/road location data 34 holds location information of a farm field included in the managed area. The farm field/road location data 34 also holds location information of a passable stretch of land included in the managed area, in which the sensing robot 3 can pass. A road is an example of a passable stretch of land.

The surrounding area data 35 is data that includes GIS data of the area surrounding a managed farm field and meteorological information of the surrounding area, for example, temperature, humidity, accumulated insolation, weather, and precipitation. The factory utilization data 37 indicates the utilization rate of processing machines in a factory where harvested sugar canes are processed.

The task plan data 38 indicates a plan of a task in a farm field. The task plan data 38 may hold an initial task plan in advance. The past occurrence distribution data 39 indicates the distribution patterns of past occurrences of diseases and insect pests. The insect pest count is an example of the situation of an insect pest occurrence. The proportion of the number of sugar canes afflicted by a disease to the number of sugar canes grown is an example of the situation of a disease occurrence. The occurrence distribution pattern data 40 indicates the distributions of occurrences of diseases and insect pests. The resource data 41 is data about resources that can be put to use for a task in a farm field. The task data 42 indicates the association between the specifics of a task and a resource that can be used to carry out the task.

The farm field data 43 indicates, for each farm field included in a managed area, a variety grown in the farm field. In this embodiment, information used by the farm field management system 100 is not dependent on a particular data structure and can have any data structure. For instance, the information can be stored in data structure selected suitably from a group consisting of a table, a list, a database, and a queue.

The sensing robot 3 includes a sensor unit 51 and a data transmitting unit 52. The sensor unit 51 includes, for example a near-infrared sensor configured to detect diseases and insect pests, and a temperature sensor and humidity sensor configured to obtain meteorological information by measurement. The sensor unit 51 may also include a camera configured to photograph diseases and insect pests, a GPS configured to obtain location information, and others.

The data transmitting unit 52 is configured to transmit information obtained by the sensor unit 51 to the farm field management apparatus 1 and the data server 2 over the network 4. Instead of the sensing robot 3, a worker on site, for example, may obtain sensor information with the use of sensors. Alternatively, a worker on site may find diseases and insect pests by sight, or may collect a sample to obtain information from the sample. The worker on site in this case transmits information of the found diseases and insect pests and information obtained from the sample to the farm field management apparatus 1 and the data server 2 over the network 4 with the use of, for example, communication equipment.

FIG. 2 depicts an example of the disease and insect pest characteristics data 31. The disease and insect pest characteristics data 31 includes, for example, a disease/insect pest ID 310, a name 311, image data 312, an occurrence time 313, a body length 314, an increase distribution model 315, an initial parameter 316, a parameter 317, and a per-insect damaged cane count 318. The disease and insect pest characteristics data 31 may further include other pieces of information about the disease or the insect pest such as the length of time the insect pest takes to grow up and a period of time over which the disease progresses.

The disease/insect pest ID 310 is the identifier of a disease or an insect pest. The name 311 is the name of the disease or the insect pest. The image data 312 is image data of the disease or the insect pest. The occurrence time 313 is a season in which the disease or the insect pest occurs. The body length 314 is the body length of the insect pest. In the case where it is a disease that is identified by the associated disease/insect pest ID 310, a value "null", for example, is stored as the body length 314.

The increase distribution model 315 is a probability distribution indicating the probability of an increment value of a value that represents the situation of a disease/insect pest occurrence when the disease or insect pest identified by the associated disease/insect pest ID 310 occurs. The initial parameter 316 is the initial value of a parameter for the associated increase distribution model 315. The parameter 317 is a parameter for the increase distribution model 315 after a time t elapses since the occurrence of the disease or the insect pest. The per-insect damaged cane count 318 indicates the number of sugar canes that are rendered unfit for harvest by the emergence of one insect pest. In the case where it is a disease that is identified by the associated disease/insect pest ID 310, a value "1" is stored as the per-insect damaged cane count 318.

FIG. 3 depicts an example of the agricultural chemical/fertilizer data 32. The agricultural chemical/fertilizer data 32 includes, for example, an agricultural chemical/fertilizer ID 320, a type 321, an applicable disease/insect pest name 322, a price 323, an effect-on-scale degree 324, and an effect-on-distribution-model degree 325. The agricultural chemical/fertilizer data 32 may further include other information about the agricultural chemical or the fertilizer, for example, the use, shape, and main component of the agricultural chemical or the fertilizer.

The agricultural chemical/fertilizer ID 320 is the identifier of an agricultural chemical or a fertilizer. The type 321 is the type of the agricultural chemical or the fertilizer. The applicable disease/insect pest name 322 is the name of a disease or an insect pest that can be cured or exterminated with the use of the agricultural chemical or fertilizer identified by the associated agricultural chemical/fertilizer ID 320. The price 323 is a price for an amount of the agricultural chemical or the fertilizer that is used in one session of a spraying task. The effect-on-scale degree 324 and the effect-on-distribution-model degree 325 indicate the degree of effect of the agricultural chemical or fertilizer on the expansion of the disease or the insect pest that is identified by the associated applicable disease/insect pest name 322, when the agricultural chemical or the fertilizer is sprayed over an area of occurrence of the disease or insect pest. Details of the effect-on-scale degree 324 and the effect-on-distribution-model degree 325 are described later.

FIG. 4 depicts an example of the variety data 33. The variety data 33 includes, for example, a variety ID 330, a sugar content change 331, and a unit sales price 332. The variety data 33 may further include other pieces of information about the variety, for example, an optimum planting time, an optimum harvesting time, and maximum sugar content. The variety ID 330 is the identifier of a variety. The sugar content change 331 indicates the sugar content of the variety at each number of months elapsed since seedlings of the variety are planted. The unit sales price 332 is a sales price per cane of the variety identified by the associated variety ID 330. The unit sales price 332 is expressed as a constant number, for example. In the case where the unit sales price 332 depends on the sugar content, the unit sales price 332 is expressed as a function of the sugar content. The sugar content depends on the length of time since planting, and the unit sales price 332 that depends on the sugar content consequently depends on the length of time since planting. A value "null" may be stored as the sugar content change 331 associated with the unit sales price 332 that does not depend on the sugar content.

FIG. 5 depicts an example of the meteorological data 36. The meteorological data 36 includes, for example, a measurement point 360, a time 361, weather 362, a temperature 363, a humidity 364, precipitation 365, and solar insolation 365. The measurement point 360 is a point at which meteorological information is collected by measurement. The time 361 is the time when the meteorological information is collected by measurement. The weather 362 is observed weather. The precipitation 365 is measured precipitation. The solar insolation 366 is measured solar insolation. Each value included in the meteorological data 36 may be a past measurement value or a predicted value.

FIG. 6 depicts an example of the factory utilization data 37. The factory utilization data 37 includes, for example, a machine ID 370 and a machine utilization rate 371. The machine ID 370 is the identifier of a machine in a factory located in a managed area. The machine utilization rate 371 is the monthly utilization rate of the machine identified by the associated machine ID 370. The machine utilization rate 371 of each machine may be a past performance value or a predicted value.

FIG. 7 depicts an example of the task plan data 38. The task plan data 38 includes a resource 380 and task specifics 381. The resource 380 is a resource used for a task. The task specifics 381 indicate, for each period, the specifics of a task carried out in the period with the use of the associated resource 380.

In the example of FIG. 7, resources put into tasks are Person 1, Person 2, Person 3, and Person 4, and all resources perform a harvest task in Field A in the first week, a harvest task in Field B in the second week, a harvest task in Field C in the third week, a harvest task in Field D in the fourth week, and a harvest task in Field E in the fifth week. While the task specifics 381 are specified on a field-by-field basis in the example of FIG. 7, the task specifics 381 may instead be specified for each patch indicated by a specific latitude and longitude.

FIG. 8 depicts an example of the past occurrence distribution data 39. The past occurrence distribution data 39 includes, for example, a disease/insect pest ID 390, a name 391, a past occurrence time 392, a measurement point 393, and a measurement point-based insect count 394. The disease/insect pest ID 390 is the identifier of a disease or an insect pest. The name 391 is the name of the disease or the insect pest. The past occurrence time 392 is the time when the disease or insect pest identified by the associated disease/insect pest ID 390 has occurred in the past. The measurement point 393 is the point where the disease or insect pest identified by the associated disease/insect pest ID 390 has occurred in the past. The measurement point-based insect count 394 indicates, for each measurement point, how many insects identified by the associated disease/insect pest ID 390 have been found at the measurement point.

FIG. 9 depicts an example of the occurrence distribution pattern data 40. The occurrence distribution pattern data 40 includes, for example, a pattern ID 400, a name 401, a disease/insect pest ID 402, a past occurrence time 403, a distribution center point 404, an initial scale 405, a distribution model 406, an initial parameter 407, a post-change scale 408, and a post-change parameter 409. The occurrence distribution pattern data 40 may also include other pieces of information about the occurrence distribution pattern, for example, the number of times the occurrence distribution pattern has appeared in the past.

The pattern ID 400 is the identifier of an occurrence distribution pattern. The name 401 is the name of the occurrence distribution pattern. The disease/insect pest ID 402 is the identifier of a disease or an insect pest that has the occurrence distribution pattern, and corresponds to the disease/insect pest ID 310 of the disease and insect pest characteristics data 31. The past occurrence time 403 is the time when the occurrence distribution pattern identified by the associated pattern ID 400 has appeared in the past. The distribution center point 404 is the center point of the occurrence distribution pattern identified by the associated pattern ID 400.

The initial scale 405 indicates the initial value of the scale of the occurrence distribution pattern. The distribution model 406 is a distribution model of the occurrence distribution pattern. A distribution name, for example, two-dimensional normal distribution or two-dimensional gamma distribution, is stored as the distribution model 406. A specific probability density function may instead be stored as the distribution model 406. A distribution stored as the distribution model 406 may be one that takes into account the form of the environment, for example, a two-dimensional contaminated normal distribution in which distributions are separated from one another by a road or the like, because there is no occurrence of diseases and insect pests in a road or the like.

The initial parameter 407 is the initial value of a parameter for a distribution model indicated by the associated distribution model 406. However, a value "null" is stored as the initial parameter 407 when a specific function is specified for the distribution model 406 as is the case for the distribution model of a distribution occurrence pattern that has "0004" as the pattern ID 400. The initial state of an occurrence distribution pattern, namely, a disease/insect pest occurrence distribution pattern at the time when the sensing robot 3 confirms the occurrence of a disease or insect pest, is expressed by the product of the initial scale 405 and the distribution model 406 to which the initial parameter 407 is applied. Expression 1 represents a two-dimensional normal distribution that is an example of the distribution model 406.

$$f(x_1, x_2) = \\ -\frac{N}{2\pi\sigma_1\sigma_2\sqrt{1-\rho^2}} \exp\left[-\frac{1}{2(1-\rho)^2}\left\{\left(\frac{x_1-\mu_1}{\sigma_1}\right)^2 + \left(\frac{x_2-\mu_2}{\sigma_2}\right)^2 - 2\rho\left(\frac{(x_1-\mu_1)(x_2-\mu_2)}{\sigma_1\sigma_2}\right)\right\}\right]$$

(Expression 1)

In Expression 1, N represents the total number of sugar canes afflicted by a disease or the total number of individual insects of a species, $\mu_1$ represents a center point in the east-west direction, $\mu_2$ represents a center point in the north-south direction, $\sigma_1$ represents dispersion in the east-west direction, $\sigma_2$ represents dispersion in the north-south direction, and $\rho$ represents a correlation coefficient. The distribution center point 404 in the two-dimensional normal distribution is expressed as ($\mu_1$, $\mu_2$), for example.

The post-change scale 408 is a scale after the time t elapses since the disease/insect pest occurrence time. The post-change parameter 409 is a parameter after the time t elapses since the disease/insect pest occurrence time. However, a function that indicates a distribution model after the time t elapses is stored as the post-change parameter 409 when a specific probability density function is specified for the distribution model 406 as is the case for a distribution occurrence pattern that has "0004" as the pattern ID 400. The occurrence distribution pattern data 40 may include, in addition to distribution patterns that have actually appeared in the past, other distribution patterns set by the operator or the like in advance. A value "null", for example, is stored as the past occurrence time 403 that is associated with a distribution pattern set by the operator or the like in advance.

FIG. 10 depicts an example of the resource data 41. The resource data 41 includes, for example, a resource ID 410, a name 411, a count 412, and a unit cost 413. The resource ID 410 is the identifier of a resource. The name 411 is the name of the resource. The count 412 is the number of available pieces of the resource identified by the associated resource ID 410. The unit cost 413 is the cost of using a piece of the resource that is identified by the associated resource ID 410 per unit time.

FIG. 11 depicts an example of the task data 42. The task data 42 includes, for example, a task ID 420, task specifics 421, a resource ID 422, and a task efficiency 423. The task ID 420 is the identifier of a task. The task specifics 421 indicate the specifics of the task. For example, "variety ID: 0001 harvesting" means the task of harvesting a variety of which the variety ID 330 is "0001", and "agricultural chemical/fertilizer ID: 0001 spraying" means the task of spraying an agricultural chemical or a fertilizer of which the agricultural chemical/fertilizer ID 320 is "0001".

The resource ID 422 is the ID of a resource that can be used to carry out the task identified by the associated task ID 420. The resource ID 422 corresponds to the resource ID 410 of the resource data 41. In the case where the resource ID 422 is "0001 and 0005", for example, it means that the task identified by the associated task ID 420 is carried out by using a resource that has "0001" as the resource ID 422 and a resource that has "0005" as the resource ID 422 at the same time. Tasks that use two resources simultaneously, for example, a harvest task in which a harvesting machine and a person who operates the harvesting machine are used qualifies as this case. The task efficiency 423 is a task efficiency with which the resource identified by the associated resource ID 422 carries out the task specified by the task specifics 421.

FIG. 12 depicts an example of the farm field data 43. The farm field data 43 includes, for example, a farm field ID 430, a name 431, a variety ID 432, a per-unit area cane count 433, and a planted time 434. The farm field ID 430 is the identifier of a farm field included in a managed area. The name 431 is the name of the farm field. The variety ID 432 is the identifier of a sugar cane variety planted in the farm field. The variety ID 432 corresponds to the variety ID 330 of the variety data 33. The per-unit area cane count 433 is the number of sugar canes planted in the farm field that is identified by the associated farm field ID 430 per unit area. The planted time 434 is the time when sugar canes have been planted in the farm field identified by the associated farm field ID 430. The farm field data 43 may not include information about a farm field in which no sugar canes are planted at present.

Figure 13:
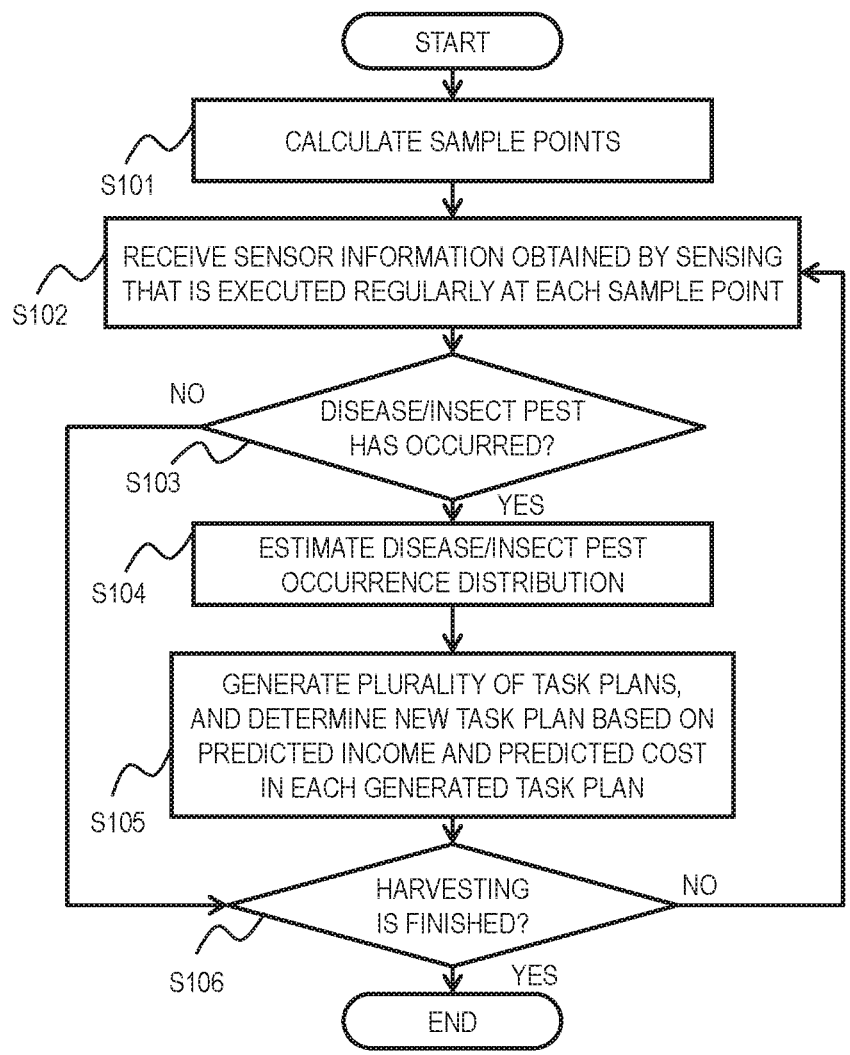
FIG. 13 is a flowchart depicting an example of management processing according to the first embodiment.

FIG. 13 depicts an example of management processing executed by the farm field management apparatus 1. First, the disease and insect pest check-use sample point calculating module 21 calculates sample points by reference to the farm field/road location data 34 (S101). The disease and insect pest check-use sample point calculating module 21, for example, divides map data of a managed area into patches of a predetermined size (in a mesh pattern, for example), and determines sample points based on the distance of each patch from a passable stretch of land. To give a specific example, the disease and insect pest check-use sample point calculating module 21 selects, for each patch created by the division, a point in the passable stretch of land that is close to a representative point (e.g., center point) of the patch, and determines each selected point as a sample point.

The disease and insect pest check-use sample point calculating module 21 does not necessarily include a selected point among sample points when, for example, the distance between the selected point and the relevant patch created by the division is equal to or greater than a predetermined value. The disease and insect pest check-use sample point calculating module 21 may arrange sample points at predetermined intervals in each passable stretch of land that faces a farm field in the managed area.

In the case where a worker on site manually performs measurement instead of the sensing robot 3, for example, examining the entire farm field for the presence or absence of diseases and insect pests is difficult in sugar cane farms, soybean farms, and other large-scale farms. A possible solution is to check for the presence or absence of diseases and insects in other parts than passable stretches of land by utilizing a satellite image or an image photographed by an unmanned aerial vehicle (UAV).

However, it is only after damage from a disease or an insect pest spreads to a certain degree that the presence of the disease or the insect pest can be observed in a satellite image or a UAV image. In addition, determining the presence or absence of a disease or an insect pest requires direct measurement of the condition of the root and stalk of a sugar cane, which makes it very difficult even for a robot to cover the entire farm area in measurement. The disease and insect pest check-use sample point calculating module 21 is capable of calculating sample points in a passable stretch of land because the farm field management apparatus 1 can estimate the distribution of a disease or an insect pest and predict the expansion of the disease or the insect pest with high precision in the manner described above.

Figure 14:
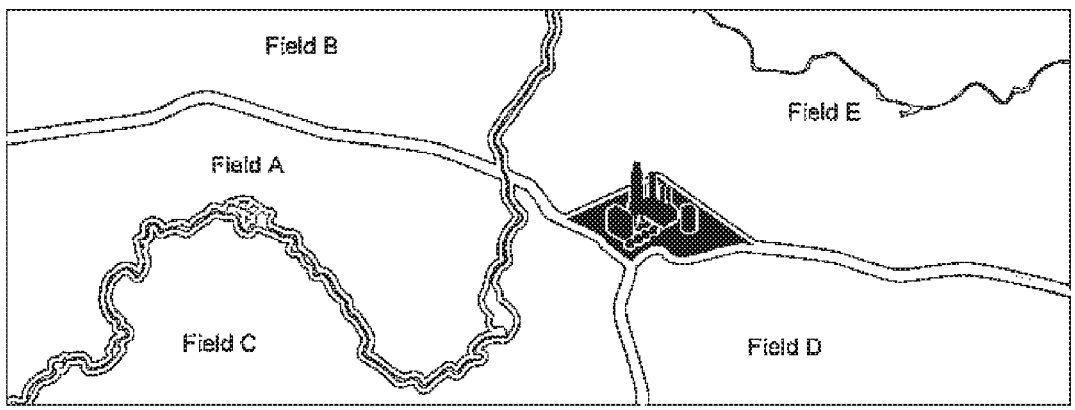
FIG. 14 depicts an example of a managed area according to the first embodiment.

FIG. 14 depicts an example of a managed area in which sample points are set. The managed area includes a processing factory located at the center, and Field A, Field B, Field C, Field D, and Field E, which are farm fields separated from one another by a river or a road.

Figure 15:
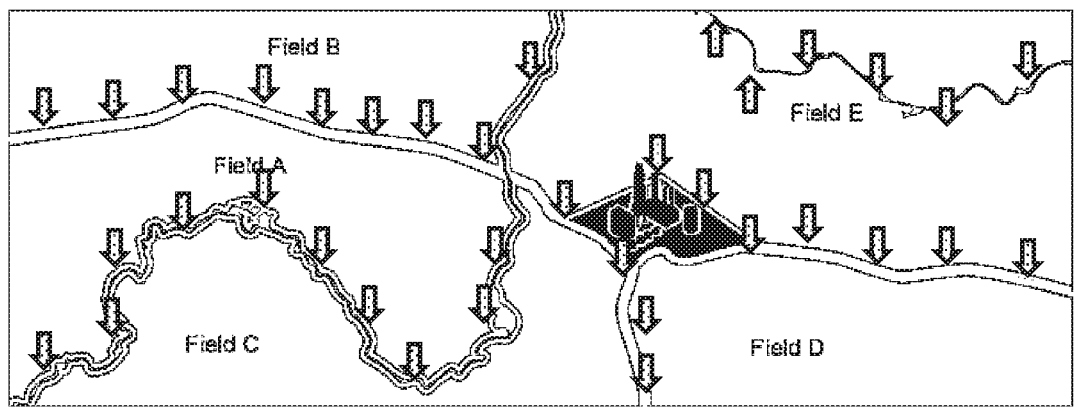
FIG. 15 depicts an example of sample points set in a managed area according to the first embodiment.

FIG. 15 depicts an example of how sample points are set. Each arrow in FIG. 15 indicates a sample point. In the example of FIG. 15, equally spaced sample points are set in the horizontal direction and vertical direction of the drawing along roads and a river that face farm fields. The interval between sample points is not necessarily an equal interval.

The description returns to FIG. 13. The disease and insect pest occurrence distribution estimating module 22 regularly receives information that is obtained by the sensor unit 51 of each sensing robot 3 placed at one of the sample points calculated in Step S101, for example, image data of a sugar cane and meteorological data (S102). The data server 2 may receive and store the information obtained by the sensing robot 3. In the case where the sensing robot 3 is capable of traveling by including a caterpillar, for example, the disease and insect pest occurrence distribution estimating module 22 may additionally obtain location information from the sensing robot 3.

The disease and insect pest occurrence distribution estimating module 22 determines whether or not there is an occurrence of a disease or an insect pest based on, for example, the received sensor information and the disease and insect pest characteristics data 31 (S103). For instance, the disease and insect pest occurrence distribution estimating module 22 determines, for each image in the image data 312, whether or not a disease or insect pest shown by the image is found in a photographed image that is received from the sensing robot 3. When determining that the disease or the insect is found in the photographed image, the disease and insect pest occurrence distribution estimating module 22 determines that there is an occurrence of the disease or insect pest shown by the image in the disease and insect pest characteristics data 31. The disease/insect pest occurrence determination in Step S103 may be executed by the sensing robot 3 or a person.

The disease and insect pest occurrence distribution estimating module 22 may determine that an insect pest is not found in an image photographed by the sensing robot 3 when, for example, the photographed image shows the insect pest but the difference between the body length of the insect pest shown in the photographed image and a body length registered as the body length 314 is equal to or larger than a predetermined threshold. The disease and insect pest occurrence distribution estimating module 22 may also exclude a disease or an insect pest as a subject for which the determination is made when, for example, a time at which an image is photographed by the sensing robot 3 is not included in the occurrence time 313 of the disease or the insect pest. Through the processing described above, the disease and insect pest occurrence distribution estimating module 22 can lessen the load of the disease and insect pest occurrence determination processing can raise the precision of the determination processing.

When there is no disease/insect pest occurrence (S103: no), the farm field management apparatus 1 moves on to Step S107 without changing the task plan. When there is an occurrence of a disease or an insect pest (S103: yes), the disease and insect pest occurrence distribution estimating module 22 estimates the distribution of the number of sugar canes afflicted by a disease and the number of individual insects of a species that are detected (S104).

The disease and insect pest occurrence distribution estimating module 22 estimates the distribution of the number of sugar canes afflicted by a disease and the number of individual insects of a species that are detected based on each sample point where an occurrence of a disease or an insect pest has been confirmed. Details of the processing of estimating the distribution of the number of sugar canes afflicted by a disease and the number of individual insects of a species that are detected are described later. In the case where there are occurrences of a plurality of strains of diseases or a plurality of species of insect pests, the disease and insect pest occurrence distribution estimating module 22 executes Step S104 for each strain of disease or each species of insect pest.

The resource optimizing module 25 generates a plurality of task plans, and determines a new task plan based on a predicted income and a predicted cost in each generated task plan which are calculated based on the situation of the farm field and a prediction on the expansion of the disease or the insect pest (S105). Details of Step S105 are described later.

The resource optimizing module 25 determines whether or not harvesting is finished in all farm fields included in the managed area (S106). For example, the resource optimizing module 25 determines that harvesting is finished in the case where a harvest completion notification is already received from the operator via the input apparatus 12, and determines that harvesting is not finished in the case where a harvest completion notification has not been received. In the case where harvesting is finished (S106: yes), the farm field management apparatus 1 ends the management processing. In the case where harvesting is not finished (S106: no), the farm field management apparatus 1 returns to Step S102.

Figure 16:
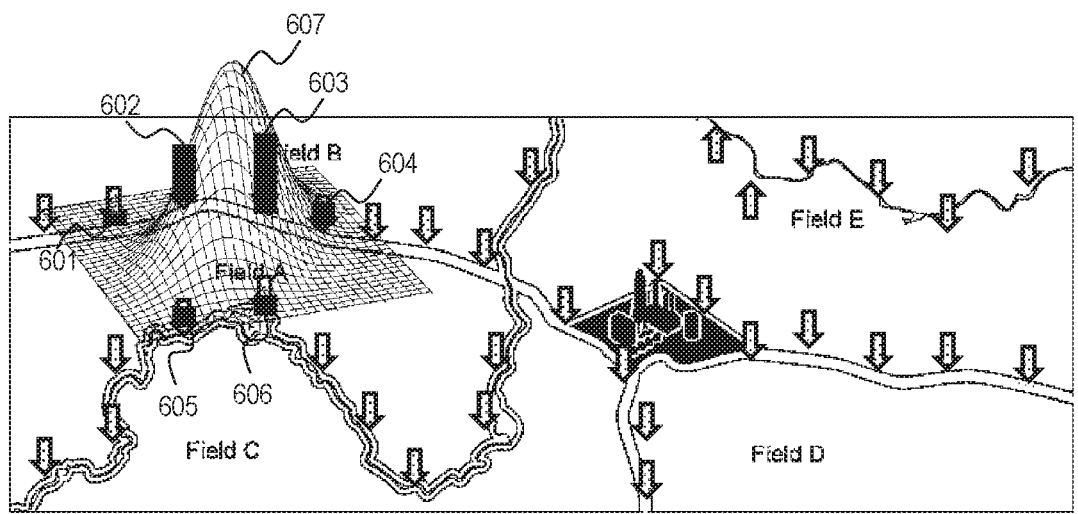
FIG. 16 depicts an example of an estimated distribution of a disease/insect pest occurrence according to the first embodiment.

FIG. 16 depicts an example of an estimated distribution of a disease/insect pest occurrence. Bar graphs 601 to 606 at sample points each indicate, for example, the situation of a disease/insect pest occurrence observed at the associated sample point. The disease and insect pest occurrence distribution estimating module 22 calculates an estimated distribution 607 of a disease or an insect pest based on the disease/insect pest occurrence situations indicated by the bar graphs 601 to 606, the locations of the sample points associated with the bar graphs 601 to 606, and the occurrence distribution pattern data 40. The estimated distribution 607 in the example of FIG. 13 is a two-dimensional normal distribution.

Figure 17:
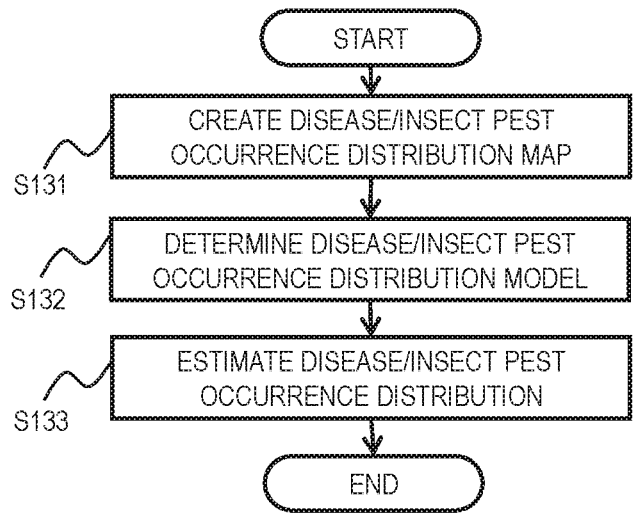
FIG. 17 is a flowchart depicting an example of disease and insect pest occurrence distribution estimating processing according to the first embodiment.

FIG. 17 depicts an example of the disease and insect pest occurrence distribution estimating processing, which corresponds to Step S104. The disease and insect pest occurrence distribution estimating module 22 executes the occurrence distribution estimating processing for each strain of disease or each species of insect pest X that has occurred. The occurrence distribution estimating processing for a disease/ insect pest X is described here. The disease and insect pest occurrence distribution estimating module 22 creates a disease/insect pest occurrence distribution map for the disease/insect pest X (S131). The disease/insect pest occurrence distribution map of the disease/insect pest X is information that indicates each sample point where the disease/insect pest has occurred and the situation of the occurrence of the disease/insect pest X at each sample point. A set made up of the bar graphs 601 to 606 in the example of FIG. 16 is an example of the disease/insect pest occurrence distribution map. The disease and insect pest occurrence distribution estimating module 22 stores information of the created disease/insect pest occurrence map in, for example, the past occurrence distribution data 39.

The disease and insect pest occurrence distribution estimating module 22 subsequently determines a disease/insect pest distribution pattern (S132). A specific processing example of Step S132 is described below. The disease and insect pest occurrence distribution estimating module 22 calculates an approximated curved surface by performing the least square method or other types of curve fitting on the situation of the occurrence of the disease/insect pest X at each sample point that is on the created disease/insect pest occurrence distribution map.

The disease and insect pest occurrence distribution estimating module 22 identifies, for each record in the occurrence distribution pattern data 40, a distribution pattern indicated by the record from the distribution center point 404, the initial scale 405, the distribution model 406, and the initial parameter 407. The disease and insect pest occurrence distribution estimating module 22 may identify only a distribution pattern of a record that has the identifier of the disease/insect pest X as the disease/insect pest ID 402. The disease and insect pest occurrence distribution estimating module 22 may identify only distribution patterns of, for example, records in which the past occurrence time 403 indicates a month included in a predetermined range of months that include a month where an occurrence of the disease/insect pest X has been confirmed.

The disease and insect pest occurrence distribution estimating module 22 determines a disease/insect pest occurrence distribution by pattern matching in which each identified distribution pattern is matched to the approximated curved surface. In the pattern matching, the disease and insect pest occurrence distribution estimating module 22 selects, out of the identified distribution patterns, one distribution pattern from which the distance to the approximated curved surface is equal to or less than a predetermined threshold, for example, and determines the selected distribution pattern as the disease/insect pest occurrence distribution. When no distribution pattern is at a distance equal to or less than the predetermined threshold from the approximated curved surface, the disease and insect pest occurrence distribution estimating module 22 may select, for example, a distribution pattern that is the smallest of the identified distribution patterns in terms of this distance. The disease and insect pest occurrence distribution estimating module 22 may also execute parameter matching to perform pattern matching.

When determining that the identified distribution patterns do not include, for example, a distribution pattern from which the distance to the approximated curved surface is equal to or less than the predetermined threshold, the disease and insect pest occurrence distribution estimating module 22 may determine the approximated curved surface as the disease/insect pest occurrence distribution. The disease and insect pest occurrence distribution estimating module 22 in this case may add information of the approximated curved surface to the occurrence distribution pattern data 40.

The disease and insect pest occurrence distribution estimating module 22 estimates the number of sugar canes afflicted by a disease and the number of individual insects of a species that are detected, by utilizing the disease/insect pest occurrence distribution determined in Step S132 (S133). The disease and insect pest occurrence distribution estimating module 22 can estimate disease/insect pest occurrence situations at other points than the sample points through the processing described above.

Figure 18:
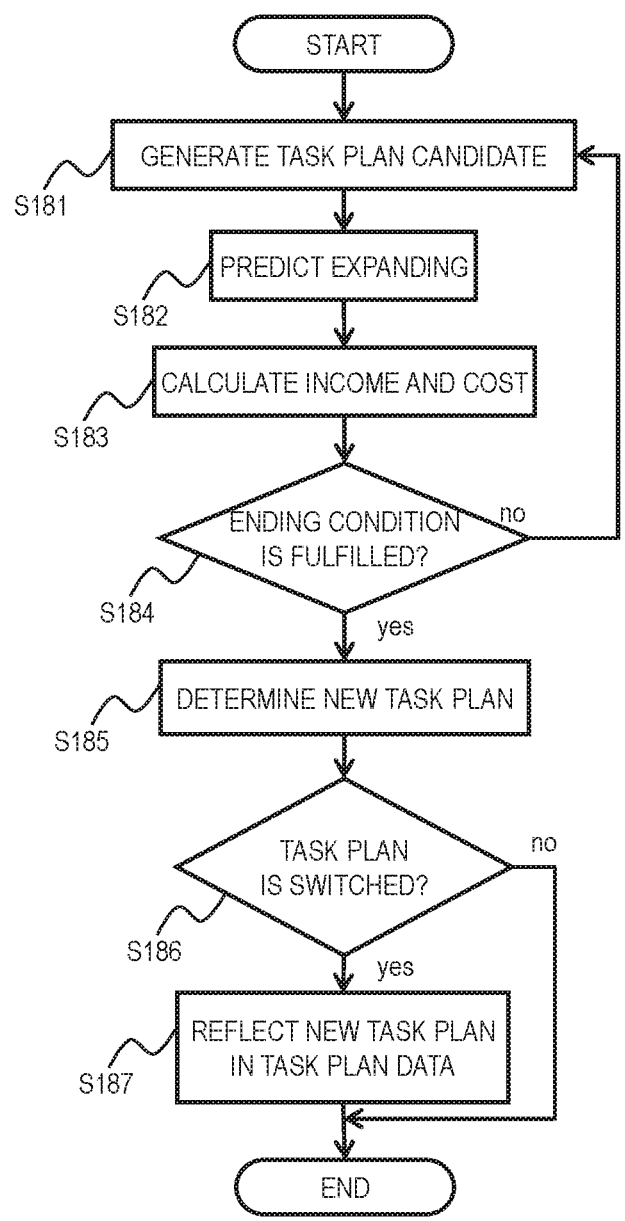
FIG. 18 is a flowchart depicting an example of task plan generating processing according to the first embodiment.

FIG. 18 depicts an example of the task plan generating processing in Step S105. The resource optimizing module 25 generates task plan candidates (S181). Specifically, the resource optimizing module 25 generates candidates for the new task plan data 38. An example of task plan candidate generating processing is described below. First, the resource optimizing module 25 follows a predetermined rule to determine task specifics to be included in a task plan candidate. For example, the resource optimizing module 25 includes, in task specifics, the task of harvesting a variety that is indicated by the variety ID 432 of the farm field data 43 and the task of spraying an agricultural chemical or fertilizer applicable to a disease or an insect pest that has occurred. The resource optimizing module 25 may instead include only the harvest task in task specifics.

For each task included in the determined task specifics, the resource optimizing module 25 obtains information of resources that can be used to carry out the task from the task data 42 by referring to the task specifics 421 and the resource ID 422, and determines the resources as used resources while taking care that the number of pieces of each determined resource be within the count 412 of the resource data 41.

The resource optimizing module 25 determines, for each determined resource, a time within a predetermined period of time as the time when the resource is to carry out the associated task. For each determined resource, the resource optimizing module 25 determines the time when the resource is used by referring to, for example, the task efficiency 423 of the resource so that tasks are not too much for the resource.

To give a specific example, the resource optimizing module 25 calculates, for each farm field, the number of sugar canes grown in the farm field from the area of the farm field which are obtained from the farm field/road location data 34, and from the per-unit area cane count 433. The resource optimizing module 25 divides, for each farm field, the calculated number of canes grown in the farm field by the task efficiency 423 of a resource that is used to carry out a task in the farm field, and uses the resultant quotient as a maximum period in which sugar canes are harvested in the farm field. The resource optimizing module 25 determines a harvest period for each farm field so that the harvest period does not exceed the maximum period. Alternatively, the resource optimizing module 25 may randomly determine, for each selected resource, the time when the resource is to carry out the associated task.

The resource optimizing module 25 may refer to the factory utilization data 37 to generate task plan candidates. For example, the resource optimizing module 25 calculates for each month the number of sugar canes that can be processed at the factory in the month, by substituting a mean value of the machine utilization rate 371 in the month into a predetermined decreasing function. The resource optimizing module 25 calculates for each month the number of sugar canes harvested in the month from the task time, the task efficiency 423 of a resource used to harvest, and the numbers of sugar canes grown in the respective farm fields. The resource optimizing module 25 checks for each month whether the number of sugar canes grown in the month exceeds the number of sugar canes that can be processed at the factory in the month. An example of the action of the resource optimizing module 25 when the number of canes that can be processed is exceeded is to discard this task plan candidate and generate a task plan candidate anew.

The disease and insect pest expansion predicting module 23 predicts, for each farm field and for each strain of disease or each species of insect pest, the expansion of the disease or the insect in the farm field at the time of harvest, based on the disease/insect pest distribution estimated for the disease or the insect pest in Step S104, the task plan candidates generated in Step S181, and the agricultural chemical/fertilizer data 32 (S182). An example of how the disease and insect pest expansion predicting module 23 predicts the expansion of the disease/insect pest X at a harvest time T is described below. In the case where the time of occurrence of the disease/insect pest X is given as $T_1$ and the time when an agricultural chemical or fertilizer applicable to the disease/insect pest X is sprayed at the point of occurrence of the disease/insect pest X is given as $T_2$, the time T is when a time $t_1$, which is expressed by $T-T_1$, elapses since the occurrence of the disease/insect pest, and is when a time $t_2$, which is expressed by $T-T_2$, elapses since the spraying of the agricultural chemical or the fertilizer.

The disease and insect pest expansion predicting module 23 changes the initial parameter in the estimated distribution of the disease/insect pest X to the post-change parameter 409 at $t=t_1$, for example. The disease and insect pest expansion predicting module 23 also changes the initial scale in the estimated distribution of the disease/insect pest X to the sum of the post-change scale 408 at $t=t_1$ and the effect-on-scale degree 324 at $t=t_2$, for example. The disease and insect pest expansion predicting module 23 adds, for example, the effect-on-distribution-model degree 325 at $t=t_2$ to the distribution obtained by making the described changes, and determines the resultant distribution as a predicted disease/insect pest expansion distribution at the harvest time T. The disease and insect pest expansion predicting module 23 may replace all negative values of the disease/insect pest occurrence situations in the predicted disease/insect pest expansion distribution with "0".

In the case where an agricultural chemical and a fertilizer have not been sprayed in a farm field of interest, the disease and insect pest expansion predicting module 23 changes the initial scale in the estimated distribution of the disease/insect pest X to the post-change scale 408 at $t=t_1$, for example. Through the processing described above, the disease and insect pest expansion predicting module 23 can obtain the situation of a disease/insect pest occurrence at each point at the harvest time T from the predicted disease/insect pest expansion distribution at the harvest time T. The disease and insect pest expansion predicting module 23 can also obtain, for example, the situation of the occurrence of the disease/insect pest X in an arbitrary patch at the time T from an integral value of the predicted disease/insect pest distribution in the arbitrary patch.

The crop yield predicting module 26 then calculates an income obtained from the harvest and calculates the cost of a task (S183). An example of income calculation is described. The crop yield predicting module 26 calculates, for each farm field, the area of the farm field from the farm field/road location data 34, and calculates the number of sugar canes grown in the farm field from the calculated area and from the per-unit area cane count 433 of the farm field data 43.

The crop yield predicting module 26 also calculates, for each farm field and for each task plan candidate created in Step S181, the number of sugar canes damaged by a disease or an insect pest at a harvest time indicated by the task plan candidate. Specifically, the crop yield predicting module 26 calculates, for each strain of disease and each species of insect pest, the number of damaged canes by multiplying the occurrence situation calculated for the disease or the insect pest in Step S182 by the per-insect damaged cane count 318 that is registered in association with the disease or the insect pest in the disease and insect pest characteristics data 31.

The crop yield predicting module 26 calculates for each farm field the difference between the number of canes grown in the farm field and the number of canes damaged in the farm field as the number of canes that can be harvested in the farm field. In the case where the calculated difference is a negative value, the crop yield predicting module 26 sets the harvestable cane count to "0". The crop yield predicting module 26 calculates, for each farm field and for each task plan candidate generated in Step S181, the number of canes harvested in the farm field from the harvestable cane count in the farm field, the task efficiency 423 of each resource input into the farm field to harvest, and a period that is set for each input resource in the task plan candidate as a period for carrying out a harvest task.

The crop yield predicting module 26 calculates for each farm field an income in the farm field by multiplying the number of canes harvested in the farm field by the unit sales price 332 that is associated with the variety of the harvested sugar canes in the variety data 33. When the unit sales price 332 depends on the sugar content, the crop yield predicting module 26 selects from the sugar content change 331 the sugar content that is associated with an appropriate number of months since the planted time 434, and calculates an income by using the selected sugar content.

The crop yield predicting module 26 may modify the selected sugar content based on a record of the meteorological data 36 that is associated with the location of the farm field. To give a specific example, the crop yield predicting module 26 may modify the selected sugar content for each farm field by adding to the selected sugar content a value that is obtained by substituting into a predetermined function the integrated temperature, the integrated humidity, the integrated precipitation, and the integrated solar insolation in a period from planting to harvesting in the farm field.

An example of cost calculation is described next. The crop yield predicting module 26 calculates, for each task plan candidate created in Step S181, a resource utilization cost by multiplying, for each used resource that is indicated in the task plan candidate, the number of used pieces of the resource, the utilization period of the resource, and the unit cost 413 of the resource, and then obtaining the sum of the resultant products of the respective used resources. The crop yield predicting module 26 also obtains, for each task plan candidate created in Step S181, the cost of an agricultural chemical or fertilizer to be sprayed in accordance with the task plan candidate from the price 323 of the agricultural chemical/fertilizer data 32. The crop yield predicting module 26 calculates the sum of the resource utilization cost and the agricultural chemical/fertilizer cost as task cost.

The resource optimizing module 25 then determines whether task plan generation is to be ended or not (S184). The resource optimizing module 25 determines whether to end task plan generation by, for example, determining whether or not a predetermined length of time has elapsed since the start of the task plan generating processing, or by determining whether or not Step S182 and Step S183 have been executed for the predetermined number of task plans.

The resource optimizing module 25 may determine that task plan generation is to be ended when a task plan in which the difference between the income and the task cost is equal to or more than a predetermined threshold is created. When the resource optimizing module 25 determines that task plan generation is not to be ended (S184: no), the farm field management apparatus 1 returns to Step S181.

When it is determined that task plan generation is to be ended (S184: yes), the resource optimizing module 25 determines a new task plan (S185). For example, the resource optimizing module 25 selects, as a new task plan, a task plan that has the largest difference between the income and the task cost out of the created task plans. The farm field management apparatus 1 may execute Step S182 and Step S183 for the initial task plan as well, so that the resource optimizing module 25 selects as a new task plan a task plan that has the largest difference between the income and the task cost from among the original task plan and the created task plans.

In Step S185, the resource optimizing module 25 may output, to the output apparatus 13, for example, each created task plan, the income and the task cost in each task plan, and the difference between the income and the task cost, thereby allowing the operator to select a new task plan from the output result. The resource optimizing module 25 in this case may output to the output apparatus 13 task plans in which the difference between the income and the task cost is equal to or more than a predetermined threshold, or the predetermined number of task plans in descending order of the difference between the income and the task cost.

When the resource optimizing module 25 selects a task plan different from the initial task plan as a new task plan (S186: yes), the selected plan is reflected in the task plan data 38 (S187) and the processing is ended. When the resource optimizing module 25 selects the initial task plan as a new task plan (S186: no), the processing is ended.

Figure 19:
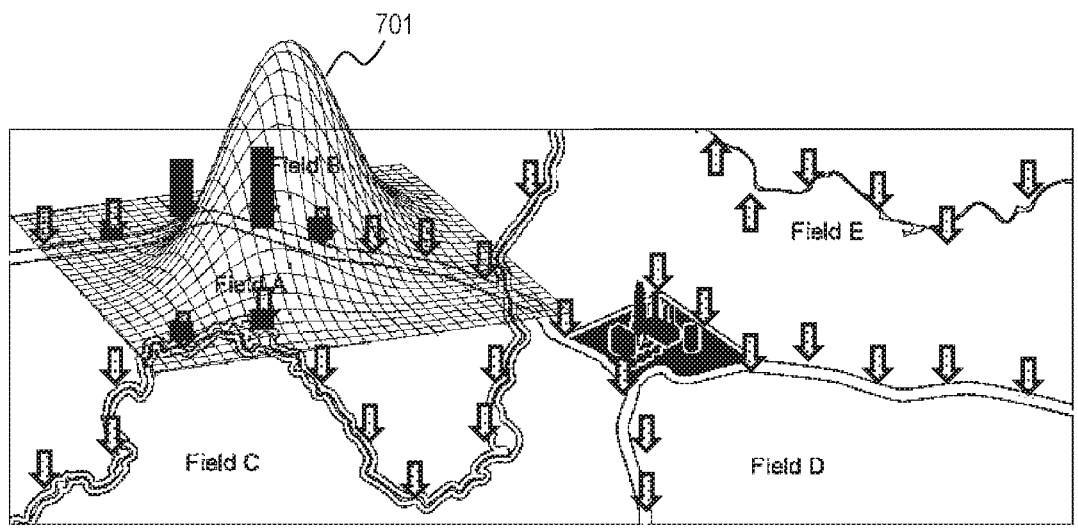
FIG. 19 depicts an example of a result of predicting a disease/insect pest expansion distribution according to the first embodiment.

FIG. 19 depicts an example of the result of predicting a disease/insect pest expansion distribution. In the example of FIG. 19, the number of sugar canes afflicted by a disease and the number of individual insects of a species that are detected in the two-dimensional normal distribution of FIG. 16 has increased and the range has expanded. The result of a disease/insect pest occurrence distribution prediction can be expressed by other distribution models than two-dimensional normal distribution, as is the case for the estimated distribution.

An example of switching task plans is described below. In the following description, a task plan indicated by the task plan data 38 of FIG. 7 is the initial task plan, and the harvest time set for each farm field in the initial task plan is the time when the sugar content of sugar canes in the farm field is highest.

Figure 20:
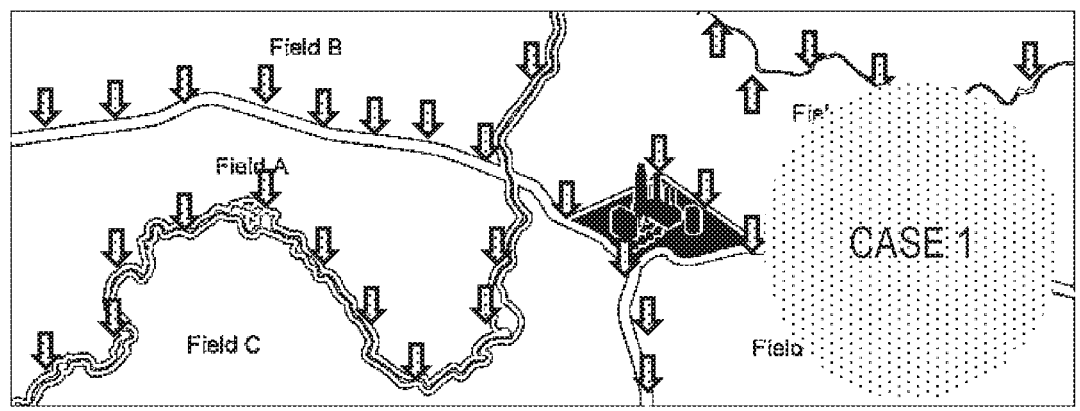
FIG. 20 depicts an example of a result of predicting a disease/insect pest expansion distribution according to the first embodiment.

FIG. 20 depicts an example of a prediction of disease/insect pest occurrence expansion. The managed area of FIG. 20 is the same as the managed area of FIG. 14. In the example of FIG. 20, a low level of disease/insect pest occurrence that covers a wide range is predicted for Field D and Field E. There is a chance that the peak of sugar content is missed when, for example, the harvest time is changed in the task of harvesting sugar canes.

The amount of sugar or ethanol produced from sugar canes that are low in sugar content is small, and the unit sales price of such sugar canes is accordingly low. When there is a low level of disease/insect pest occurrence that covers a wide range as the one in FIG. 20, the difference between income and cost is therefore likely to be large in, for example, a task plan of the farm field management apparatus 1 that uses few resources to deal with the disease or the insect pest over a long period of time and that keeps as close as possible to the initial harvest plan.

FIG. 21 depicts an example of a task plan that addresses the predicted disease/insect pest expansion of FIG. 20. In the example of FIG. 21, Person 1 deals with the disease/insect pest occurrence by spraying an agricultural chemical in the first week and the second week, while other resources carry out the harvest task. Damage from the disease or the insect pest causes a drop in the yield of Field D and Field E, and the harvest task in FIG. 21 is therefore one man-week less than that in the initial task plan (less by one week of tasks performed by one man) in Field D and Field E each.

In the case where a generated task plan includes harvesting the same farm field over a plurality of weeks, the same resources are desirably assigned to the harvest task as much as possible. In the example of FIG. 21, harvest resources assigned to Field C are the same in the third week and the fourth week.

FIG. 22 depicts an example of a prediction of disease/insect pest occurrence expansion. The managed area of FIG. 22 is the same as the managed area of FIG. 14. In the example of FIG. 22, a high level of disease/insect pest occurrence is predicted for Field C and Field D. A large number of sugar canes afflicted by a disease or a large number of individual insects of a species that are detected causes a greater drop in yield. The difference between income and cost is therefore likely to be large in, for example, a task plan where the disease or the insect pest is dealt with in a concentrated manner even if doing so requires changing the harvest time to other times than when the sugar content is highest.

FIG. 23 depicts an example of a task plan that addresses the predicted disease/insect pest expansion of FIG. 22. In the example of FIG. 23, Person 1, Person 2, Person 3, and Person 4 all deal with the disease/insect pest occurrence in the first week and, thereafter, carry out harvest tasks in order, starting from Field A. Damage from the disease or the insect pest causes a drop in the yield of Field C and Field D, and the harvest tasks in FIG. 23 is therefore two men-week less than that in the initial task plan (less by one week of tasks performed by two men) in Field C and Field D each.

The farm field management apparatus 1 of this embodiment can thus dynamically generate a task plan that optimizes an income and cost by predicting the level of damage based on the situation of an occurrence of a disease, an insect pest, or the like, and determining a task plan with the use of the result of the prediction.

Second Embodiment

The farm field management apparatus 1 of this embodiment generates a task plan by taking into account the influence of rainfall on the task of harvesting sugar canes. Rainfall during a sugar cane harvesting task creates situations unsuitable for harvesting, for example, an undesirable soil condition and a reduction in the sugar content of sugar canes. Rainfall is an example of harvest impeding factors. It is important to deal with those situations properly. The farm field management apparatus 1 therefore generates a task plan based on meteorological information.

FIG. 24 depicts an example of farm field management processing executed by the farm field management apparatus 1. The insect pest occurrence distribution estimating module 22 refers to the surrounding area data 35 and/or the meteorological data 36 to collect meteorological information (S141). The insect pest occurrence distribution estimating module 22 may receive sensor information about weather from the sensing robot 3.

The insect pest occurrence distribution estimating module 22 determines, based on the collected meteorological information, whether or not rainfall is predicted for a farm field within a period included in a task plan (S142). The insect pest occurrence distribution estimating module 22 determines, for example, that rainfall is predicted for a farm field that includes the measurement point 360 at which the precipitation 365 is equal to or more than a predetermined value, in a period of a predetermined range that includes the time 361. In the case where the surrounding area data 35 indicates that the precipitation of a point A around the managed area is equal to or more than a predetermined value at the time T, for example, the insect pest occurrence distribution estimating module 22 determines that rainfall is predicted in a farm field within a predetermined distance from the point A, in a period of a predetermined range that starts after a predetermined length of time elapses since the time T.

When it is determined that rainfall is predicted for a farm field within a period included in the task plan (S142: yes), the insect pest occurrence distribution estimating module 22 estimates a harvestable range based on the rainfall prediction (S143). To give a specific example, the insect pest occurrence distribution estimating module 22 determines a part of the farm field that excludes the rainfall range as a harvestable range that can be harvested during the rainfall.

When it is determined that no rain fall is predicted for any farm field in a period included in the task plan (S142: no), the insect pest occurrence distribution estimating module 22 moves on to Step S145.

The resource optimizing module 25 generates a plurality of task plans based on the harvestable range, and determines a new task plan based on a predicted income and a predicted cost in each generated task plan (S144). Specifically, the resource optimizing module 25 generates each task plan under a constraint that, for example, only the harvestable range can be harvested in each period. Other processing procedures in Step S144 are the same as those in Step S105.

The resource optimizing module 25 determines whether harvesting is finished in all farm fields included in the managed area (S145). Step S145 is the same as Step S106. When the harvesting is finished (S145: yes), the farm field management apparatus 1 ends the management processing. In the case where the harvesting is not finished (S142: no), the farm field management apparatus 1 returns to Step S141.

The farm field management apparatus 1 may estimate the harvestable range based on other types of meteorological information than rainfall, for example, temperature or solar insolation. The farm field management apparatus 1 may take meteorological information along with a disease/insect pest expansion prediction into account when a task plan is generated in the first embodiment based on the expansion prediction. In other words, the farm field management apparatus 1 may execute Step S181 under the constraint that limits harvest to the harvestable range based on meteorological information. The farm field management apparatus 1 of this embodiment can thus generate a task plan in which the harvest time is adjusted to an appropriate time by taking meteorological information into consideration.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A farm field management apparatus, which is configured to manage a managed area including at least one farm field, the farm field management apparatus comprising:
   a processor;
   a storage apparatus, and
   a sensing robot disposed in the managed area, the sensing robot including a sensor configured to detect diseases and insect pests in the managed area and a data transmitter configured to transmit data from the sensor to the processor;
   wherein the storage apparatus is configured to hold:
     resource information, which indicates resources, and which indicates, for each of the resources, a task carried out by the resource and per-unit time utilization cost of the resource; and
     farm field information, which indicates a quantity of a crop grown in each of the at least one farm field and a unit price of the crop,
   wherein the resources includes a resource that is used to carry out a harvest task in the at least one farm field, and
   wherein the processor is configured to:
     generate a plurality of task plan candidates;
     in the generation of each of the plurality of task plan candidates, select at least one task that includes the harvest task in the at least one farm field from the resource information, select, for each selected task, a resource that is used to carry out the selected task from the resource information, determine, for each selected task, a task time within a predetermined period in which the selected task is carried out, include the selected task, the selected resource, and the determined task time in each of the plurality of task plan candidates;
     obtain information about a harvest impeding factor that is predicted for a harvest time of each of the plurality of task plan candidates;
     calculate an income from a harvest of each of the plurality of task plan candidates, based on a relevant piece of the harvest impeding factor information, and on the quantity and unit price of each crop indicated by the farm field information; and calculate task cost of each of the plurality of task plan candidates based on a resource utilization period of the resource included in each of the plurality of task plan candidates, and on the utilization cost indicated by the resource information, wherein the storage apparatus is configured to further hold a plurality of disease/insect pest occurrence distribution patterns in the managed area, based on the data received from the sensor robot, and wherein the processor is configured to:

obtain a result of measuring a disease/insect pest occurrence situation at each of a plurality of sample points within the managed area;

estimate a disease/insect pest occurrence distribution in the managed area based on a result of comparison between the obtained disease/insect pest occurrence situation measurement result and each of the plurality of disease/insect pest occurrence distribution patterns;

predict a disease/insect pest expansion situation at the harvest time in each of the plurality of task plan candidates, based on the estimated disease/insect pest occurrence distribution; and calculate the income from the harvest of each of the plurality of task plan candidates, based on the relevant predicted disease/insect pest expansion situation and on the quantity and unit price of each crop indicated by the farm field information, wherein the storage apparatus is configured to further hold agricultural chemical/fertilizer information, which indicates agricultural chemicals or fertilizers, and which indicates degrees of effect of each of the agricultural chemicals or the fertilizers on each disease and each insect pest, wherein the resources includes a resources that is used to spray the agricultural chemicals or the fertilizers, and wherein the processor is configured to:

determine, in the generation of each of the plurality of task plan candidates, the at least one task that includes the harvest task in the at least one farm field and a task of spraying one of an agricultural chemical or a fertilizer that is indicated by the agricultural chemical/fertilizer information at a disease/insect pest occurrence point indicated by the disease/insect pest occurrence distribution; and predict a disease/insect pest expansion situation at the harvest time in each of the plurality of task plan candidates, based on the disease/insect pest occurrence distribution, a time at which the spray task is carried out, and the degree of effect indicated by the agricultural chemical/fertilizer information.

2. The farm field management apparatus according to claim 1, wherein the storage apparatus is configured to further hold:

map information of the managed area; and sample point placement information, which indicates a stretch of land in the managed area where sample points are placeable, and wherein the processor is configured to:

divide the managed area into a plurality of patches by referring to the map information;

select, for each of the plurality of patches, a point that is within the placeable stretch of land indicated by the sample point placement information and that is within a predetermined distance from the patch; and determine each selected point as one of the plurality of sample points.

3. The farm field management apparatus according to claim 1, wherein the farm field information indicates a planted time of each crop, wherein the unit price of each crop indicated by the farm field information is expressed by a function dependent on how long it is since planting of the crop, and wherein the processor is configured to calculate the income from the harvest of each of the plurality of task plan candidates, based on the relevant piece of the harvest impeding factor information, the planted time and quantity of each crop indicated by the farm field information, and the function that represents the unit price of the crop.

4. The farm field management apparatus according to claim 1, wherein the processor is configured to:

obtain a rainfall time and rainfall range of rainfall that is predicted for the farm field within the predetermined period;

estimate a harvestable range at the obtained rainfall time based on the obtained rainfall range; and select the task and the resource to be included in each of the plurality of task plan candidates, based on the estimated harvestable range, and determine a task time to be included in the each of the plurality of task plan candidates, based on the estimated harvestable range.

5. The farm field management apparatus according to claim 1, further comprising a display apparatus, wherein the processor is configured to:

select one or more task plans from among the plurality of task plan candidates, based on a result of comparing, for each of the plurality of task plan candidates, the income and the task cost; and display the one or more task plans on the display apparatus.

6. A method for managing a managed area including at least one farm field by a farm field management apparatus:

wherein the farm field management apparatus includes a processor and a storage apparatus, and further includes a sensing robot disposed in the managed area, the sensing robot including a sensor configured to detect diseases and insect pests in the managed area and a data transmitter configured to transmit data from the sensor to the processor, the farm field management apparatus being configured to hold:

resource information, which indicates resources, and which indicates, for each of the resources, a task carried out by the resource and per-unit time utilization cost of the resource; and farm field information, which indicates a quantity of a crop grown in each of the at least one farm field and a unit price of the crop, wherein the resources includes a resource that is used to carry out a harvest task in the at least one farm field, and the method comprising:

generating, by the farm field management apparatus, a plurality of task plan candidates;

in the generation of each of the plurality of task plan candidates, selecting, by the farm field management apparatus, at least one task that includes the harvest task in the at least one farm field from the resource information, selecting, by the farm field management apparatus, for each selected task, a resource that is used to carry out the selected task from the resource information, determining, by the farm field management apparatus, for each selected task, a task time within a predetermined period in which the selected task is carried out, include the selected task, the selected resource, and the determined task time in each of the plurality of task plan candidates;

obtaining, by the farm field management apparatus, information about a harvest impeding factor that is predicted for a harvest time of each of the plurality of task plan candidates;

calculating, by the farm field management apparatus, an income from a harvest of each of the plurality of task plan candidates, based on a relevant piece of the harvest impeding factor information, and on the quantity and unit price of each crop indicated by the farm field information; and calculating, by the farm field management apparatus, task cost of each of the plurality of task plan candidates based on a resource utilization period of the resource included in each of the plurality of task plan candidates, and on the utilization cost indicated by the resource information, wherein the farm field management apparatus is configured to further hold a plurality of disease/insect pest occurrence distribution patterns in the managed area, based on the data received from the sensor robot, and the method further comprising:

obtaining, by the farm field management apparatus, a result of measuring a disease/insect pest occurrence situation at each of a plurality of sample points within the managed area;

estimating, by the farm field management apparatus, a disease/insect pest occurrence distribution in the managed area based on a result of comparison between the obtained disease/insect pest occurrence situation measurement result and each of the plurality of disease/insect pest occurrence distribution patterns;

predicting, by the farm field management apparatus, a disease/insect pest expansion situation at the harvest time in each of the plurality of task plan candidates, based on the estimated disease/insect pest occurrence distribution; and calculating, by the farm field management apparatus, the income from the harvest of each of the plurality of task plan candidates, based on the relevant predicted disease/insect pest expansion situation and on the quantity and unit price of each crop indicated by the farm field information, wherein the farm field management apparatus is configured to further hold agricultural chemical/fertilizer information, which indicates agricultural chemicals or fertilizers, and which indicates degrees of effect of each of the agricultural chemicals or the fertilizers on each disease and each insect pest, wherein the resources includes a resources that is used to spray the agricultural chemicals or the fertilizers, and the method further comprising:

determining, by the farm field management apparatus, in the generation of each of the plurality of task plan candidates, the at least one task that includes the harvest task in the at least one farm field and a task of spraying one of an agricultural chemical or a fertilizer that is indicated by the agricultural chemical/fertilizer information at a disease/insect pest occurrence point indicated by the disease/insect pest occurrence distribution; and predicting, by the farm field management apparatus, a disease/insect pest expansion situation at the harvest time in each of the plurality of task plan candidates, based on the disease/insect pest occurrence distribution, a time at which the spray task is carried out, and the degree of effect indicated by the agricultural chemical/fertilizer information.

7. The method according to claim 6, wherein the farm field management apparatus is configured to further hold:

map information of the managed area; and sample point placement information, which indicates a stretch of land in the managed area where sample points are placeable, and the method further comprising:

dividing, by the farm field management apparatus, the managed area into a plurality of patches by referring to the map information;

selecting, by the farm field management apparatus, for each of the plurality of patches, a point that is within the placeable stretch of land indicated by the sample point placement information and that is within a predetermined distance from the patch; and determining, by the farm field management apparatus, each selected point as one of the plurality of sample points.

8. The method according to claim 6, wherein the farm field information indicates a planted time of each crop, wherein the unit price of each crop indicated by the farm field information is expressed by a function dependent on how long it is since planting of the crop, and the method further comprising calculating, by the farm field management apparatus, the income from the harvest of each of the plurality of task plan candidates, based on the relevant piece of the harvest impeding factor information, the planted time and quantity of each crop indicated by the farm field information, and the function that represents the unit price of the crop.

9. The method according to claim 6, further comprising:

obtaining, by the farm field management apparatus, a rainfall time and rainfall range of rainfall that is predicted for the farm field within the predetermined period;

estimating, by the farm field management apparatus, a harvestable range at the obtained rainfall time based on the obtained rainfall range; and selecting, by the farm field management apparatus, the task and the resource to be included in each of the plurality of task plan candidates, based on the estimated harvestable range, and determine a task time to be included in the each of the plurality of task plan candidates, based on the estimated harvestable range.

10. The method according to claim 6, wherein the farm field management apparatus includes a display apparatus, the method further comprising:

selecting, by the farm field management apparatus, one or more task plans from among the plurality of task plan candidates, based on a result of comparing, for each of the plurality of task plan candidates, the income and the task cost; and displaying, by the farm field management apparatus, the one or more task plans on the display apparatus.

11. A computer-readable non-transitory recording medium having stored thereon a program for causing a computer in a farm field management apparatus to manage a managed area including at least one farm field,
wherein the farm field management apparatus includes a processor and a storage apparatus in the computer, and further includes a sensing robot disposed in the managed area, the sensing robot including a sensor configured to detect diseases and insect pests in the managed area and a data transmitter configured to transmit data from the sensor to the processor,
wherein the computer is configured to hold:
resource information, which indicates resources, and which indicates, for each of the resources, a task carried out by the resource and per-unit time utilization cost of the resource; and
farm field information, which indicates a quantity of a crop grown in each of the at least one farm field and a unit price of the crop,
wherein the resources includes a resource that is used to carry out a harvest task in the at least one farm field, and
the program causing the computer to execute:
a procedure of generating a plurality of task plan candidates;
a procedure of, in the generation of each of the plurality of task plan candidates, selecting at least one task that includes the harvest task in the at least one farm field from the resource information, selecting, for each selected task, a resource that is used to carry out the selected task from the resource information, determining, for each selected task, a task time within a predetermined period in which the selected task is carried out, and including the selected task, the selected resource, and the determined task time in each of the plurality of task plan candidates;
a procedure of obtaining information about a harvest impeding factor that is predicted for a harvest time of each of the plurality of task plan candidates;
a procedure of calculating an income from a harvest of each of the plurality of task plan candidates, based on a relevant piece of the harvest impeding factor information, and on the quantity and unit price of each crop indicated by the farm field information; and
a procedure of calculating task cost of each of the plurality of task plan candidates based on a resource utilization period of the resource included in each of the plurality of task plan candidates, and on the utilization cost indicated by the resource information,
wherein the farm field management apparatus is configured to further hold a plurality of disease/insect pest occurrence distribution patterns in the managed area, based on the data received from the sensor robot, and
the program further causing the computer to execute:
obtaining, by the farm field management apparatus, a result of measuring a disease/insect pest occurrence situation at each of a plurality of sample points within the managed area;
estimating, by the farm field management apparatus, a disease/insect pest occurrence distribution in the managed area based on a result of comparison between the obtained disease/insect pest occurrence situation measurement result and each of the plurality of disease/insect pest occurrence distribution patterns;
predicting, by the farm field management apparatus, a disease/insect pest expansion situation at the harvest time in each of the plurality of task plan candidates, based on the estimated disease/insect pest occurrence distribution; and
calculating, by the farm field management apparatus, the income from the harvest of each of the plurality of task plan candidates, based on the relevant predicted disease/insect pest expansion situation and on the quantity and unit price of each crop indicated by the farm field information,
wherein the farm field management apparatus is configured to further hold agricultural chemical/fertilizer information, which indicates agricultural chemicals or fertilizers, and which indicates degrees of effect of each of the agricultural chemicals or the fertilizers on each disease and each insect pest,
wherein the resources includes a resources that is used to spray the agricultural chemicals or the fertilizers, and
the program further causing the computer to execute:
determining, by the farm field management apparatus, in the generation of each of the plurality of task plan candidates, the at least one task that includes the harvest task in the at least one farm field and a task of spraying one of an agricultural chemical or a fertilizer that is indicated by the agricultural chemical/fertilizer information at a disease/insect pest occurrence point indicated by the disease/insect pest occurrence distribution; and
predicting, by the farm field management apparatus, a disease/insect pest expansion situation at the harvest time in each of the plurality of task plan candidates, based on the disease/insect pest occurrence distribution, a time at which the spray task is carried out, and the degree of effect indicated by the agricultural chemical/fertilizer information.

* * * * *